United States Patent
Kwak et al.

(10) Patent No.: US 11,886,242 B2
(45) Date of Patent: Jan. 30, 2024

(54) ELECTRONIC DEVICE FOR SUPPORTING SLIDING OPERATION

(71) Applicant: Samsung Electronics Co., Ltd., Suwon-si (KR)

(72) Inventors: Myunghoon Kwak, Suwon-si (KR); Raetae Kim, Suwon-si (KR); Yongyoun Kim, Suwon-si (KR); Gisoo Lim, Suwon-si (KR); Byounguk Yoon, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 17/512,073

(22) Filed: Oct. 27, 2021

(65) Prior Publication Data

US 2022/0050501 A1 Feb. 17, 2022

Related U.S. Application Data

(63) Continuation of application No. PCT/KR2021/009009, filed on Jul. 14, 2021.

(30) Foreign Application Priority Data

Aug. 6, 2020 (KR) .......................... 10-2020-0098310

(51) Int. Cl.
- *G06F 1/16* (2006.01)
- *F16K 31/08* (2006.01)
- *F16K 31/06* (2006.01)

(52) U.S. Cl.
CPC ........ *G06F 1/1624* (2013.01); *F16K 31/0675* (2013.01); *F16K 31/086* (2013.01)

(58) Field of Classification Search
CPC .................................................... G06F 1/1624
See application file for complete search history.

(56) References Cited

U.S. PATENT DOCUMENTS

| 7,547,775 B2 | 6/2009 | Kuimelis et al. |
| 7,681,256 B2 | 3/2010 | Fullerton et al. |
| (Continued) | | |

FOREIGN PATENT DOCUMENTS

| JP | 2011-114609 A | 6/2011 |
| KR | 10-0543794 B1 | 1/2006 |
| (Continued) | | |

OTHER PUBLICATIONS

International Search Report dated Nov. 5, 2021, issued in International Patent Application No. PCT/KR2021/009009.

*Primary Examiner* — Hsinchun Liao
(74) *Attorney, Agent, or Firm* — Jefferson IP Law, LLP

(57) ABSTRACT

An electronic device is provided. The electronic device includes a first housing, a second housing coupled to the first housing and that performs a sliding operation, a display, of which a size of a visual exposure area is changed in correspondence to the sliding operation of the second housing, a first variable magnetism member disposed at a first location of the first housing, and of which a magnetic force varies depending on a current or a voltage that is supplied thereto, a second variable magnetism member disposed at a second location of the first housing, and of which a magnetic force varies depending on a current or a voltage that is supplied thereto, a magnet member fixed to an inner surface of the second housing, and that moves between the first variable magnetism member and the second variable magnetism member during the sliding operation, and a processor operatively connected.

20 Claims, 15 Drawing Sheets

(56) References Cited

U.S. PATENT DOCUMENTS

| | | |
|---|---|---|
| 7,724,113 B2 | 5/2010 | Fullerton et al. |
| 8,314,751 B2 | 11/2012 | Yang |
| 9,159,512 B2 | 10/2015 | Kodama et al. |
| 10,809,767 B2 | 10/2020 | Ou et al. |
| 10,861,628 B2 | 12/2020 | Wang |
| 2008/0058034 A1 | 3/2008 | Lu et al. |
| 2009/0251259 A1 | 10/2009 | Fullerton et al. |
| 2011/0157036 A1* | 6/2011 | Yang .................. G06F 1/1679 |
| | | 345/173 |
| 2013/0335174 A1 | 12/2013 | Kodama et al. |
| 2016/0365187 A1 | 12/2016 | Fullerton et al. |
| 2017/0109114 A1* | 4/2017 | Wang .................. G06F 1/1677 |
| 2017/0268691 A1 | 9/2017 | Fullerton et al. |
| 2020/0020470 A1 | 1/2020 | Wang |

FOREIGN PATENT DOCUMENTS

| | | |
|---|---|---|
| KR | 10-2006-0023233 A | 3/2006 |
| KR | 10-2006-0086656 A | 8/2006 |
| KR | 10-2007-0069096 A | 7/2007 |
| KR | 10-1040020 B1 | 6/2011 |
| KR | 10-2019-0043826 A | 4/2019 |
| KR | 10-2020-0009998 A | 1/2020 |

\* cited by examiner

ELECTRONIC DEVICE FOR SUPPORTING SLIDING OPERATION

CROSS-REFERENCE TO RELATED APPLICATIONS

This application is a continuation application, claiming priority under § 365(c), of an International Application No. PCT/KR2021/009009, filed on Jul. 14, 2021, which was based on and claimed the benefit of a Korean patent application number 10-2020-0098310, filed on Aug. 6, 2020, in the Korean Intellectual Property Office, the disclosures of which is incorporated by reference herein in its entirety.

BACKGROUND

1. Field

The disclosure relates to an electronic device that supports a sliding operation.

2. Description of Related Art

In recent years, displays of various sizes have been mounted on portable electronic devices in consideration of various purposes, such as portability and usability. Furthermore, electronic devices that may adjust the sizes of displays have been developed to satisfy various needs of users. As an example, studies on flexible displays mounted on electronic devices in roll structures have increased. The flexible displays of the roll structures have been expanded to large areas as the rolled areas are expanded in correspondence to the structural modifications of the electronic devices.

An electronic device that supports a sliding operation of a roll structure may have a state, in which a portion of a display is slid into the electronic device, and a state, in which a portion of the display is unfolded through a sliding operation. The electronic device may maintain the wound state or the unfolded state by using elasticity of the display. However, due to the elasticity, a load of a specific magnitude or more may be present during an initial operation of the sliding operation of the display.

Various embodiments of the disclosure provide an electronic device that may reduce a load during a sliding operation of a display by using a magnet member and a variable magnetism member.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that supports a sliding operation of a roll structure may have a state, in which a portion of a display is slid into the electronic device, and a state, in which a portion of the display is unfolded through a sliding operation.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing coupled to the first housing and that performs a sliding operation, a display, of which a size of a visual exposure area is changed in correspondence to the sliding operation of the second housing, a first variable magnetism member disposed at a first location of the first housing, and of which a magnetic force varies depending on a current or a voltage that is supplied thereto, a second variable magnetism member disposed at a second location of the first housing, and of which a magnetic force varies depending on a current or a voltage that is supplied thereto, a magnet member fixed to an inner surface of the second housing, and that moves between the first variable magnetism member and the second variable magnetism member during the sliding operation, and a processor operatively connected to the first variable magnetism member and the second variable magnetism member, the magnet member is disposed adjacent to the first variable magnetism member in a closed state, in which the first housing and the second housing overlap each other by a first extent, and the processor is configured to control the first variable magnetism member such that the first variable magnetism member has a first magnetic force of a first magnitude, when receiving a user input, control the first variable magnetism member such that the first variable magnetism member has a second magnetic force of a second magnitude that is larger than the first magnitude when the second housing is moved from a location corresponding to the closed state by a first distance or more such that an overlapping area of the first housing and the second housing becomes smaller, and set polarity directions of the first magnetic force and the second magnetic force to be opposite to a polarity direction of the magnet member.

In accordance with another aspect of the disclosure, an electronic device is provided. The electronic device includes a first housing, a second housing coupled to the first housing and that performs a sliding operation, a display, of which a size of a visual exposure area is changed in correspondence to the sliding operation of the second housing, a first variable magnetism member disposed at a first location of the first housing, and of which a magnetic force varies depending on a current or a voltage that is supplied thereto, a second variable magnetism member disposed at a second location of the first housing, and of which a magnetic force varies depending on a current or a voltage that is supplied thereto, a magnet member fixed to an inner surface of the second housing, and that moves between the first variable magnetism member and the second variable magnetism member during the sliding operation, and a processor operatively connected to the first variable magnetism member and the second variable magnetism member, the magnet member is disposed adjacent to the second variable magnetism member in an opened state, in which the first housing and the second housing overlap each other by a first extent, and the processor is configured to control the second variable magnetism member such that the second variable magnetism member has a first magnetic force of a first magnitude, when receiving a specific user input, control the second variable magnetism member such that the second variable magnetism member has a second magnetic force of a second magnitude that is larger than the first magnitude when the second housing is moved from a location corresponding to the opened state by a first distance or more such that an overlapping area of the first housing and the second housing becomes larger, and set polarity directions of the first magnetic force and the second magnetic force to be opposite to a polarity direction of the magnet member.

According to the embodiments of the disclosure, the electronic device may reduce a load during the sliding operation of the display.

Furthermore, according to the embodiments of the disclosure, the electronic device may reduce power consumption by supplying current to the variable magnetism member by stages during the sliding operation of the display.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, is should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
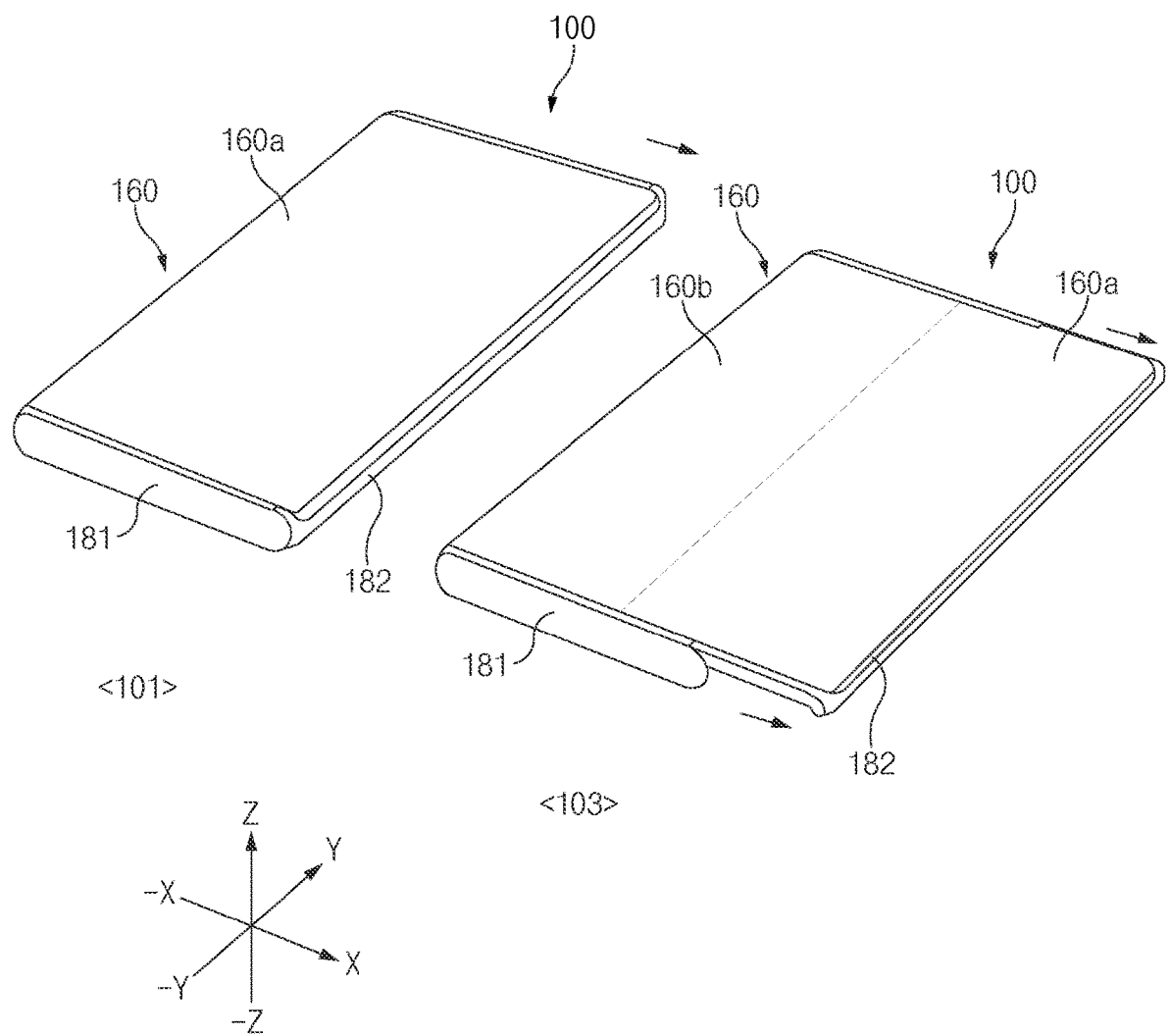
FIG. 1 is a view illustrating an example of an external appearance of an electronic device according to an embodiment of the disclosure.

FIG. 1 is a view illustrating an example of an external appearance of an electronic device according to an embodiment of the disclosure.

Referring to FIG. 1, an electronic device 100 according to an embodiment may include a display 160 (e.g., a flexible display, of which at least a portion has flexibility), a first housing 181, and a second housing 182. For example, the first housing 181 may function as a fixing cover that accommodates portions of a second housing and a display. The second housing 182 may function as a sliding cover, to which one side of the display 160 is fixed. The second housing 182 may be moved in a first direction (e.g., the X axis direction) with respect to the first housing 181 or may be moved in a second direction (e.g., the −X axis direction that is opposite to the first direction). As in state 101, when the first housing 181 and the second housing 182 overlap each other by a first width, a first display area 160a of a first size may be disposed to face an upward direction (e.g., the Z axis direction). Alternatively, in state 101, the display 160 may include the first display area 160a of a first size, which is visually exposed to an outside.

According to an embodiment, in state 101, the first housing 181 may be disposed to surround at least a portion of the first display area 160a in the second axis direction (e.g., the −X axis direction), at least a portion of the first display area 160a in a third axis direction (e.g., the Y axis direction), at least a portion of the first display area 160a in a fourth axis direction (e.g., the −Y axis direction), and at least a portion of the first display area 160a in a fifth axis direction (e.g., the −Z axis direction or a direction that is opposite to the Z axis direction). The second housing 182 may be disposed to surround at least a portion of the first display area 160*a* in the first axis direction (e.g., the X axis direction), at least a portion of the first display area 160*a* in the third axis direction (e.g., the Y axis direction), at least a portion of the first display area 160*a* in the fourth axis direction (e.g., the −Y axis direction), and at least a portion of the first display area 160*a* in the fifth axis direction (e.g., the −Z axis direction).

According to an embodiment, in state 101, at least a portion of a second display area 160*b*, which extends from the first display area 160*a*, may be disposed to be wounded on or unfolded from an inner side of at least one of the first housing 181 and the second housing 182. In this state, a surface of the first display area 160*a*, from which light from pixels is irradiated, faces a forward direction (e.g., the Z axis direction), and at least a portion of an upper surface of the second display area 160*b*, in which the pixels are disposed, may face a rearward direction (e.g., the −Z axis direction). A portion of the second display area 160*b* may be curved.

According to an embodiment, when the second housing 182 is moved in the first direction (e.g., the X axis direction) with respect to the first housing 181, a visual exposure area of the display 160 may be expanded. For example, when the first housing 181 and the second housing 182 overlap each other by a second width (e.g., a size that is smaller than the first width) in state 103 (e.g., a state, in which the second housing 182 has performed a sliding operation to expand an area of the display 160), the display 160 may include the first display area 160*a* of a first size, which is visually exposed to an outside (or faces the upward direction (e.g., the Z axis direction), and the second display area 160*b* of a second size. In state 103, the first size of the first display area 160*a* and the second size of the second display area 160*b* may be the same. Alternatively, the first size may be larger than the second size. According to various embodiments, the second size may vary according to a sliding distance or a movement distance of the second housing 182.

According to an embodiment, a portion of the display 160 may be maintained wound in state 101, and at least a portion of the wound portion of the display 160 may be unfolded in state 103. For example, in state 103, the first housing 181 may be disposed to surround at least a portion of the second display area 160*b* in the second axis direction (e.g., the −X axis direction), at least a portion of the second display area 160*b* in a third axis direction (e.g., the Y axis direction), at least a portion of the second display area 160*b* in a fourth axis direction (e.g., the −Y axis direction), and at least a portion of the second display area 160*b* in a fifth axis direction (e.g., the −Z axis direction or a direction that is opposite to the Z axis direction).

According to various embodiments, at least a portion of the second housing 182 may be connected to an inner side of the first housing 181, and may be slid in any one of the first direction (e.g., the X axis direction) and the second direction (e.g., the −X axis direction) along an inner surface of the first housing 181. While the first housing 181 and the second housing 182 are slid, the first housing 181 and the second housing 182 may be disposed to surround an edge of the display 160. Various electronic elements related to driving of the display 160, electronic elements related to various user functions supported by the electronic device 100, and/or batteries may be disposed on inner sides of the first housing 181 and the second housing 182.

Figure 2:
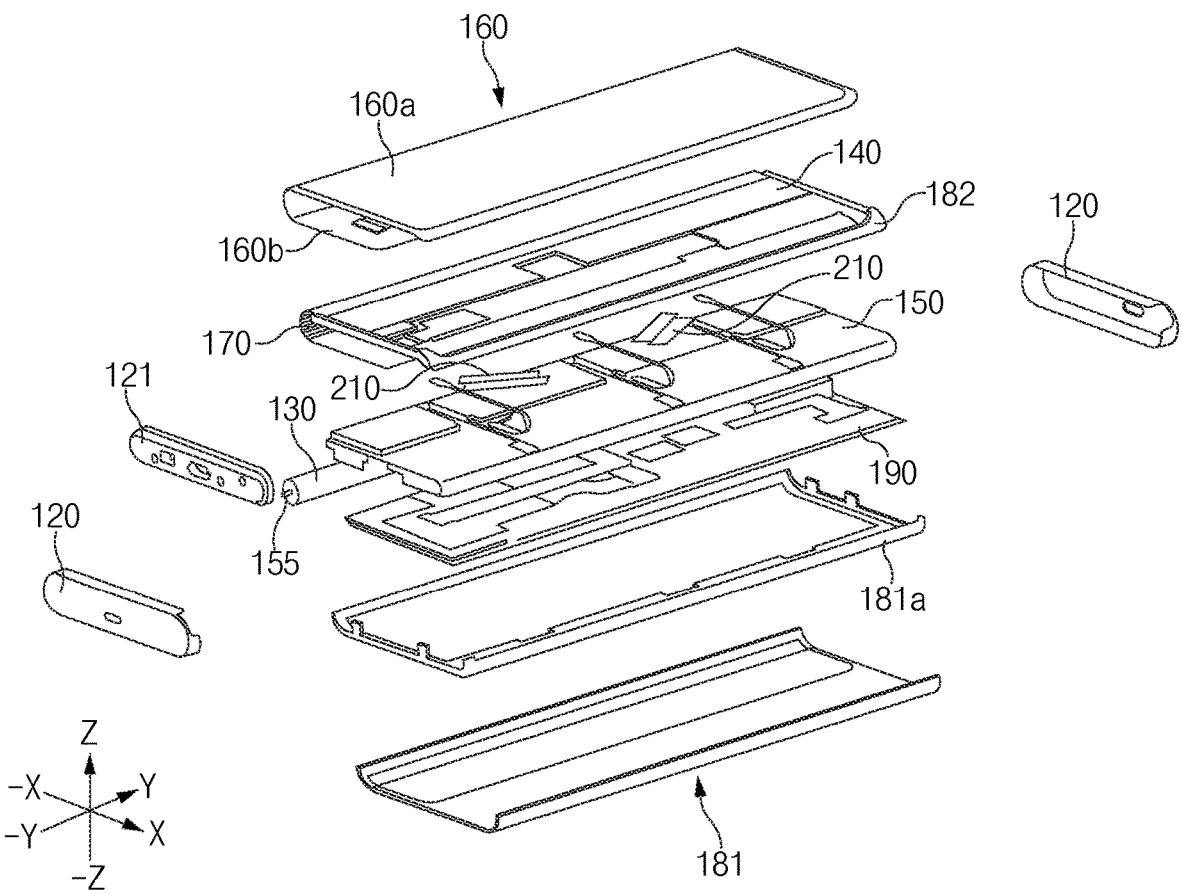
FIG. 2 is an exploded perspective view of configurations of the electronic device of FIG. 1 according to an embodiment of the disclosure.

FIG. 2 is an exploded perspective view of configurations of the electronic device of FIG. 1 an embodiment of the disclosure.

Referring to FIG. 2, an electronic device 100 according to an embodiment may include a display 160, a panel support member 170, a display support member 140, a support structure 150, a sliding support member 121, an actuator 130, an elastic module 210, a printed circuit board 190, the first housing 181, and the second housing 182.

According to an embodiment, a plurality of pixels are disposed in a matrix form in the display 160, and at least some of the pixels may be provided in a flexible form. As an example, the display 160 may include a panel layer, in which the plurality of pixels are disposed and a screen is displayed, and an outer protection layer disposed on the panel layer. The outer protection layer may be formed of a polymer structure (e.g., polyimide) or glass. Additionally, the display 160 may further include a touch panel layer. The display 160, as described with reference to FIG. 1, may include the first display area 160*a* and the second display area 160*b*. At least a portion of the second display area 160*b* may be disposed to be wound on an inner side of the first housing 181 in state 101 of FIG. 1, and may be visually exposed to an outside of the first housing 181 in state 103. While at least a portion of the second display area 160*b* is wound and is curved with respect to a rotary shaft 155 (or a ring gear part or a rotary shaft member), the remaining portions of the second display area 160*b* may be disposed on a rear surface of the first display area 160*a*.

According to an embodiment, one side (e.g., at least a portion of the second display area 160*b*) of the display 160 may be held on an inner side of at least one of the first housing 181 and the second housing 182. In this state, one end of the display 160 disposed on an inner side of the electronic device 100 may be coupled to an elastic member. For example, while the second display area 160*b* of the display 160 is exposed to an outside, an elastic force by the elastic member may be applied to the display 160 as a tension and a repulsive force in a curved section of the display 160 may be offset. Accordingly, a wound portion of the display 160 may be maintained uniformly.

According to an embodiment, the display support member 140 may support the display 160 while having a specific strength. For example, at least a portion of the display support member 140 may be formed of aluminum or an aluminum alloy, and a surface of the display support member 140, which faces the display 160, may be flat. As an example, at least a portion of the display support member 140 may be formed of an injection-molded product (e.g., a structure including plastic or magnesium). In state 101, a first surface (e.g., a surface that is observed from the Z direction) of the display support member 140 may face a rear surface (e.g., a surface that is observed from the −Z axis direction) of the first display area 160*a*, and a second surface (e.g., a surface that is observed from the −Z axis direction) of the display support member 140 may face an upper surface (e.g., a surface that is observed from the Z axis direction) of the support structure 150.

According to an embodiment, at least a portion of the display support member 140 (or the display 160) may be coupled to the second housing 182, and may be slid according to the sliding operation of the second housing 182. Alternatively, the second housing 182 may be moved by the actuator 130. In this regard, a separate physical button that may instruct driving of the actuator may be disposed in the electronic device 100 or a menu related to driving of the actuator may be output on a display screen of the display 160. While the second housing 182 is moved in the first direction (e.g., the X axis direction), at least a portion of the panel support member 170 is moved in the first direction (e.g., the X axis direction), and a disposition direction of the second display area 160b of the display 160 fixed to the panel support member 170 may be changed from sixth direction (e.g., the −Z direction) to a fifth direction (the Z axis direction). While the second housing 182 is moved in the first direction (e.g., the X axis direction), at least a portion of the panel support member 170 may be moved to a side surface of the second housing 182 while being disposed on a lower surface of the second housing 182.

According to an embodiment, the panel support member 170 may have a shape, in which a plurality of columns (or bosses, long bars, or slates) having a specific length in the third direction (e.g., the Y axis direction) are disposed at a specific interval. At least a portion of the panel support member 170 may form a locus and a portion (e.g., the second display area 160b) of the display disposed on the locus may be moved (or slid). One side lengths of the protrusions may correspond to one side length of the display 160. The panel support member 170 may be disposed to surround at least a portion of the support structure 150. Surfaces of the plurality of bosses constituting the panel support member 170, which face the rear surface of the display 160, may be flat, and a portion (e.g., a portion that faces the rotary shaft 155) disposed to face the support structure 150 may protrude. For example, a lower surface (e.g., surfaces of the bosses, which face the rotary shaft 155) may have ridges and valleys of a gear, which are repeatedly formed. According to the sliding operation, among the plurality of bosses constituting the panel support member 170, the bosses disposed on the upper surface or the lower surface of the support structure 150 may be disposed to be continuous to the adjacent other bosses, and may form a flat surface. Among the bosses constituting the panel support member 170, the bosses disposed at locations that face the rotary shaft 155 may be disposed to be spaced apart from the adjacent bosses at a specific interval. The panel support member 170 may include a connection chain or a connection shaft that connects the plurality of bosses. At least one of the plurality of bosses may be formed of a material (e.g., a magnetic body (an object that forms an attractive force through a reaction with a magnetic force) or a magnet) that reacts a magnetic force.

According to an embodiment, the rotary shaft 155 (or a rolling gear part or a rotary shaft member) may have a length that is similar to one side length of the panel support member 170, and may be disposed at an edge of one side of the support structure 150. For example, the rotary shaft 155 may have a cylindrical rod shape. Centers of opposite side surfaces of the rotary shaft 155 may protrude further from surroundings. Central portions of the opposite side surfaces of the protruding rotary shaft 155 may be held on one side of the support structure 150. Accordingly, the rotary shaft 155 may be rotated while the second housing 182 is moved in the first direction (e.g., the X axis direction). At least a portion of the rotary shaft 155 may be gear-coupled to the panel support member 170. Alternatively, the rotary shaft 155 may contact at least a portion of the panel support member 170. While the rotary shaft 155 is rotated, a disposition form of the panel support member 170 may be changed.

According to an embodiment, the actuator 130 may receive electric power from a battery included in the electronic device 100 and generate power. A pinion gear may be disposed on one side of the actuator 130, and the pinion gear may be geared on a rack formed on one side of the panel support member 170. According to an operation of the actuator 130, the second housing 182 and the display 160 may be moved in the first direction (e.g., the X axis direction) or the second direction (e.g., the −X axis direction). The actuator 130 may be disposed long in a lengthwise direction (e.g., the Y axis direction or the −Y axis direction) of the support structure 150, and at least one actuator 130 may be disposed.

According to an embodiment, at least one hardware element (e.g. the printed circuit board 190, the processor, or the battery) related to driving of the electronic device 100 may be disposed on an inner side of the support structure 150. For example, the printed circuit board 190 may be disposed between the support structure 150 and the first housing 181. Electronic elements (e.g., a processor, a communication circuit, a memory, and a sensor module) for driving the electronic device 100 may be disposed in the printed circuit board 190.

According to an embodiment, the sliding support member 121 may be coupled to one side of the support structure 150. The sliding support member 121 may be coupled to the second housing 182 such that the second housing 182 and the display 160 may be moved.

According to an embodiment, the elastic module 210 may assist movement of the second housing 182. For example, the elastic module 210 may include a first spring and a second spring that are mutually complementarily coupled to each other. A portion of the elastic module 210 may be coupled to the support structure 150. Another portion of the elastic module 210 may be coupled to the second housing 182. Accordingly, when the second housing 182 is moved to a specific point in the first direction (e.g., the X axis direction), the elastic module 210 may apply an elastic force in the second direction (e.g., the −X axis direction). When the second housing 182 passes by the specific point in the first direction (e.g., the X axis direction), the elastic module 210 may apply an elastic force to a specific point in the first direction (e.g., the X axis direction).

According to an embodiment, the first housing 181 may include a cover base 181a including side walls disposed to surround a bottom surface, on which at least a portion of the support structure 150 is seated, and an edge (e.g., side parts disposed at ends in the X axis direction and the −X axis direction) of the support structure 150, and a guard member 120 that fixes an edge (e.g., side parts disposed at ends in the Y axis direction and the −Y axis direction) of the support structure 150. A coupling part is disposed in the third direction (e.g., the Y axis direction) or the fourth direction (e.g., the −Y axis direction) of the first housing 181, and at least a portion of the first housing 181 in the third direction (e.g., the Y axis direction) or the fourth direction (e.g., the −Y axis direction) of the first housing 181 may be closed while the guard member 120 is coupled to the coupling part. The first direction (e.g., the X axis direction) of the first housing 181 is opened, and the second housing 182 may be coupled through the first direction (e.g., the X axis direction).

According to an embodiment, the second housing 182 may be coupled to the first housing 181 in the first direction (e.g., the X axis direction). The second housing 182 may include side walls (e.g., side walls disposed in the X axis direction, the Y axis direction, and the −Y axis direction) that surround some side surfaces of the support structure 150. The second housing 182 may be moved in the first direction (e.g., the X axis direction) or the second direction (e.g., the −X axis direction) while being seated on the support structure 150. Then, a disposition form and a location of the second housing 182 may be changed according to an operation of the actuator. Furthermore, the disposition form and the location of the second housing 182 may be changed through an external force by a user.

Meanwhile, in the above description, the structure, in which various configurations of the electronic device 100 are disposed, has been described, but the disclosure is not limited thereto. For example, the electronic device 100 according to the embodiment of the disclosure may include the display, the first housing that surrounds one side of the display, the panel support member disposed on one side of the display, the rotary shaft that contacts the panel support member, and the second housing coupled to the first housing, and the other configurations may be added or excluded if necessary.

The above-described electronic device 100 may include the actuator, and may be operated such that the second display area 160b is automatically expanded or contracted under the control of the actuator. Alternatively, in the electronic device 100, while the second housing 182 is moved in the first direction (e.g., the X axis direction) by an external force applied to the second housing 182, the panel support member 170 and the rotary shaft 155 engaged with the second housing 182 may be rotated such that the second display area 160b may be expanded or contracted in a manual scheme. Alternatively, the rotary shaft 155 may be disposed in the second housing 182 and the display 160 may be fixed to the first housing 181 so that a partial area of the display 160 accommodated in the second housing 182 may be expanded or contacted as the second housing 182 is moved in the electronic device 100.

Figure 3:
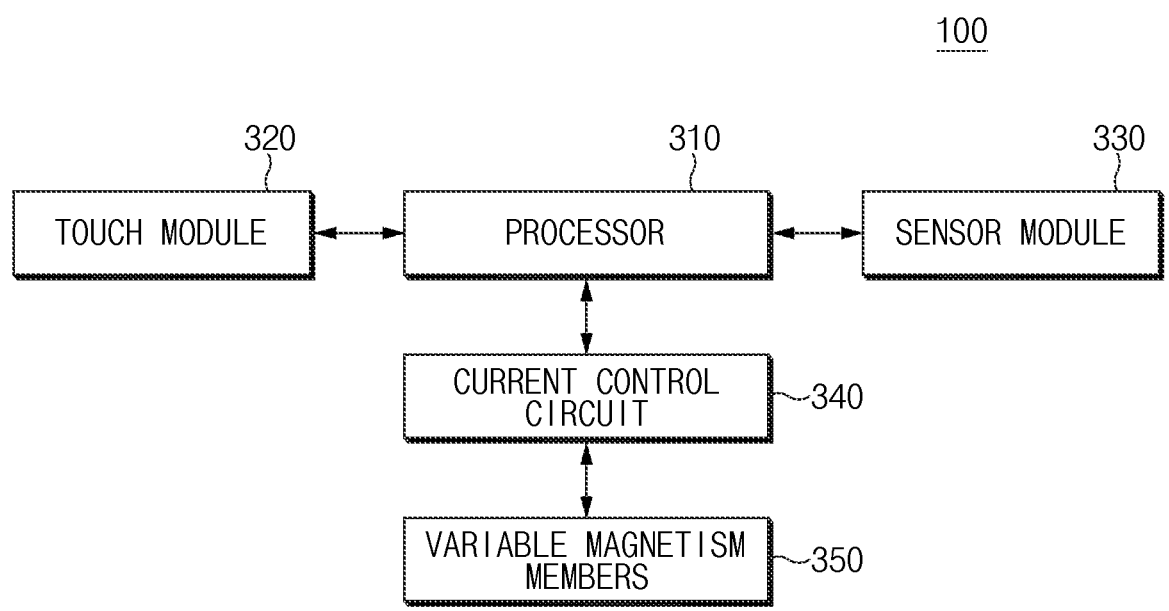
FIG. 3 is a block diagram exemplarily illustrating configurations of an electronic device according to an embodiment of the disclosure.

FIG. 3 is a block diagram exemplarily illustrating configurations of an electronic device according to an embodiment of the disclosure.

Figure 4:
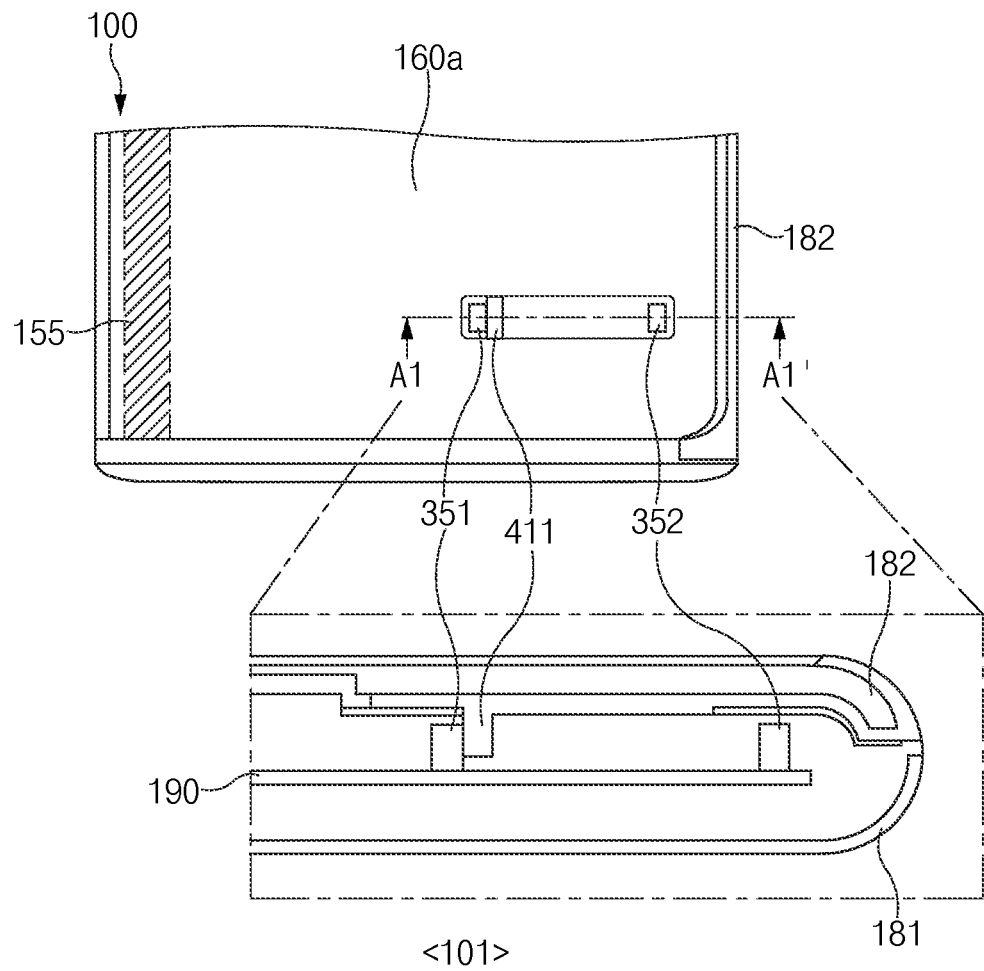
FIG. 4 is a view illustrating a portion of the electronic device of FIG. 1 and a cross-section thereof in a closed state according to an embodiment of the disclosure.
Figure 4:
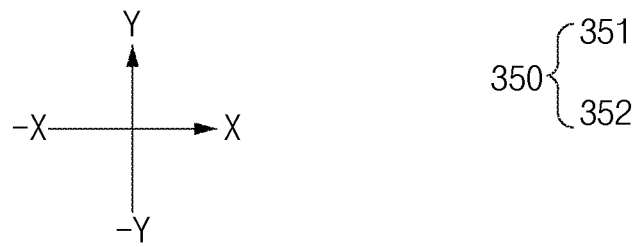

FIG. 4 is a view illustrating a portion of the electronic device of FIG. 1 and a cross-section thereof in a closed state an embodiment of the disclosure.

Figure 5:
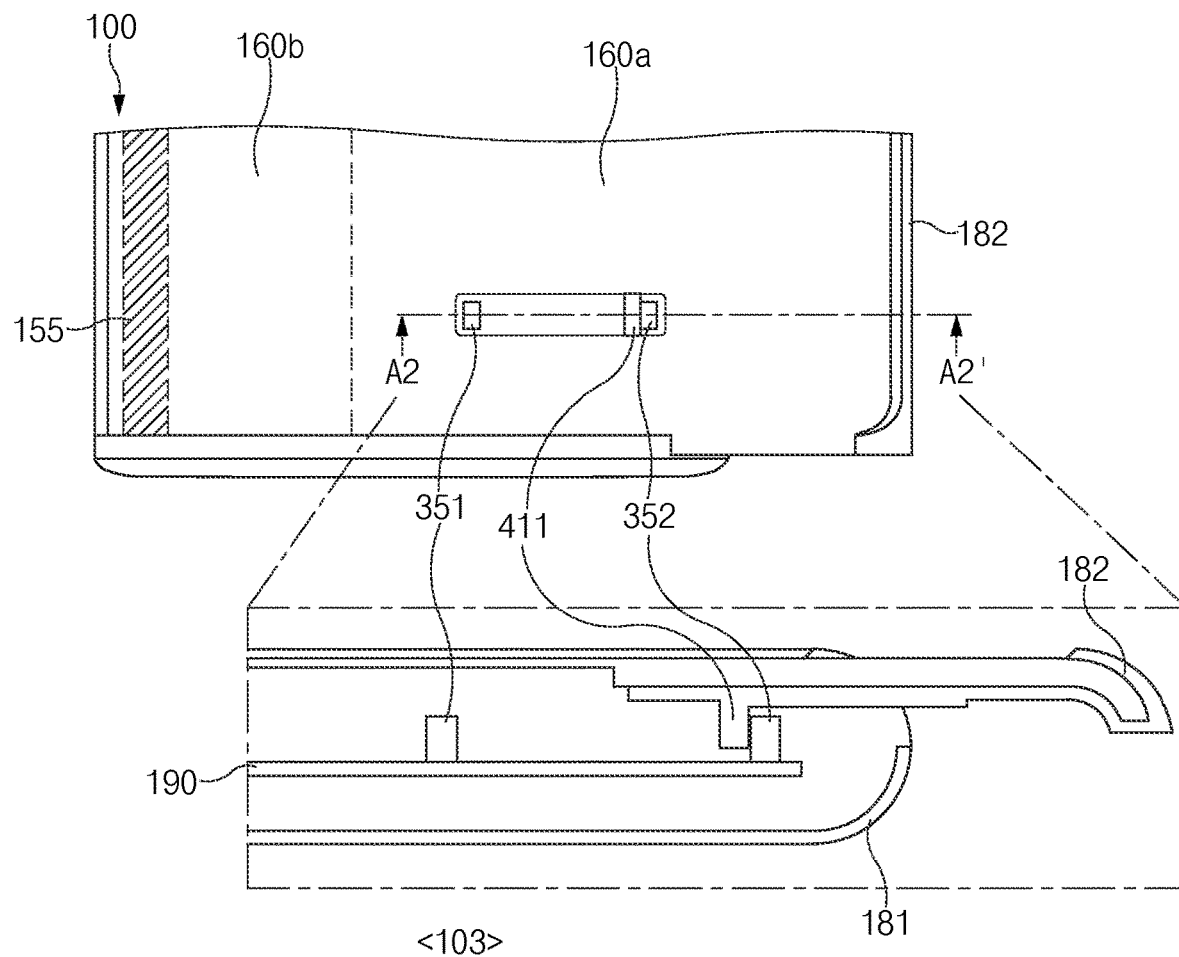
FIG. 5 is a view illustrating a portion of the electronic device of FIG. 1 and a cross-section thereof in an opened state according to an embodiment of the disclosure.

FIG. 5 is a view illustrating a portion of the electronic device of FIG. 1 and a cross-section thereof in an opened state an embodiment of the disclosure.

Figure 6:
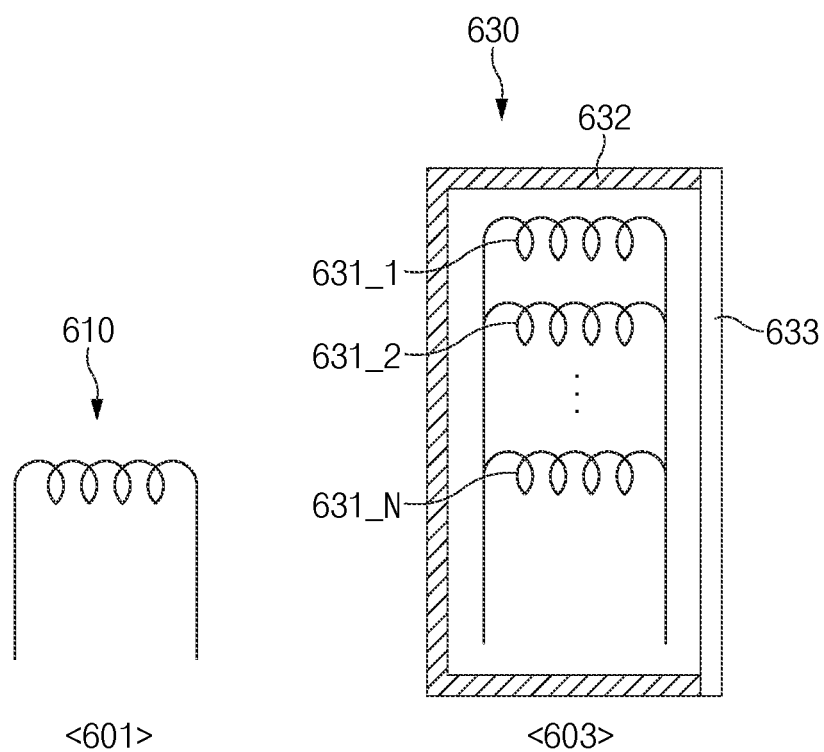
FIG. 6 is a view illustrating an example of a variable magnetism member of FIG. 4 or FIG. 5 according to an embodiment of the disclosure.

FIG. 6 is a view illustrating an example of a variable magnetism member of FIG. 4 or FIG. 5 an embodiment of the disclosure.

Referring to FIGS. 3 to 5, an electronic device 100 may include a processor 310, a touch module 320, a sensor module 330, a current control circuit 340, or variable magnetism members 350. The second housing 182 of the electronic device 100 may include a first magnet member 411. The variable magnetism members 350 may be disposed on one surface (e.g., a surface that faces the Y axis direction) of the printed circuit board 190. The variable magnetism members 350 may include a first variable magnetism member 351 and a second variable magnetism member 352. The second variable magnetism member 352 may be disposed in the first direction (e.g., the X axis direction) from the first variable magnetism member 351. The first magnet member 411 may be disposed between the first variable magnetism member 351 and the second variable magnetism member 352. As an example, the variable magnetism members 350 may include electromagnets, of which magnitudes of magnetic forces are controlled depending on a current or a voltage that is supplied. As another example, the variable magnetism members 350 may include magnets, of which magnitudes and directions of magnetic forces are changed through rotation thereof. Hereinafter, a description will be made with the assumption that the variable magnetism members 350 are electromagnets. According to an embodiment, the first magnet member 411 may include a plurality of magnets. For example, for the first magnet member 411, two magnets may be coupled to each other or separated from each other and may be disposed between the first variable magnetism member 351 and the second variable magnetism member 352.

According to an embodiment, in state 101 (e.g., the closed state), the first magnet member 411 may be disposed adjacent (or close) to the first variable magnetism member 351. The processor 310 may detect a specific user input (e.g., a specific touch input, a movement of the second housing 182 in the first direction (e.g., the X axis direction), or a click of a specific physical button) through the touch module 320 or the sensor module 330. When detecting the specific user input, the processor 310 may control the variable magnetism members 350 (or control currents or voltages supplied to the variable magnetism members 350) to generate a specific magnetic force (or provide a specific magnetic force). While state 101 (e.g., the closed state) is changed to state 103 (e.g., the opened state), the processor 310 may control the magnitudes and the directions of the variable magnetism members 350 by stages. Accordingly, when the second housing 182 is slid in the first direction (e.g., the X axis direction), a force (e.g., a pushing force of the user or a driving force of a motor) that is necessary for moving the second housing 182 may be reduced.

According to an embodiment, in state 103 (e.g., the opened state), the first magnet member 411 may be disposed adjacent (or close) to the second variable magnetism member 352. The processor 310 may detect a specific user input (e.g., a specific touch input, a movement of the second housing 182 in the second direction (e.g., the −X axis direction), or a click of a specific physical button) through the touch module 320 or the sensor module 330. When detecting the specific user input, the processor 310 may control the variable magnetism members 350 (or control currents or voltages supplied to the variable magnetism members 350) to generate a specific magnetic force (or provide a specific magnetic force). While state 103 (e.g., the opened state) is changed to state 101 (e.g., the closed state), the processor 310 may control the magnitudes and the directions of the variable magnetism members 350 by stages. Accordingly, when the second housing 182 is slid in the second direction (e.g., the −X axis direction), a force (e.g., a pushing force of the user or a driving force of a motor) that is necessary for moving the second housing 182 may be reduced.

According to an embodiment, winding directions of the variable magnetism members 350 may be variously determined. As an example, the winding directions of the first variable magnetism member 351 and the second variable magnetism member 352 may be the same. Then, when the current of the same direction are applied, the first variable magnetism member 351 and the second variable magnetism member 352 may apply forces of different kinds to the first magnet member 411. For example, when the first variable magnetism member 351 applies a repulsive force (or an attractive force) to the first magnet member 411, the second variable magnetism member 352 may apply an attractive force (or a repulsive force) to the first magnet member 411. As another example, the winding directions of the first variable magnetism member 351 and the second variable magnetism member 352 may be opposite to each other. Then, when the current of the same direction are applied, the first variable magnetism member 351 and the second variable magnetism member 352 may apply a force of the same kind to the first magnet member 411. For example, when the first variable magnetism member 351 applies a repulsive force (or an attractive force) to the first magnet member 411, the second variable magnetism member 352 also may apply a repulsive force (or an attractive force) to the first magnet member 411.

According to an embodiment, a method of connecting the variable magnetism members 350 may be variously determined. As an example, the first variable magnetism member 351 and the second variable magnetism member 352 may be formed of one winding. In this case, the processor 310 may simultaneously control the first variable magnetism member 351 and the second variable magnetism member 352 through one current signal. As another example, the first variable magnetism member 351 and the second variable magnetism member 352 may be formed of different windings. In this case, the processor 310 may control the first variable magnetism member 351 and the second variable magnetism member 352, respectively, through different current signals.

Referring to FIG. 6, as in case 601, a first variable magnetism member 351 and a second variable magnetism member 352 may be formed of one coil 610. Alternatively, in case 603, the first variable magnetism member 351 and the second variable magnetism member 352 may be formed of a coil structure 630, in which a plurality of coils 631_1 to 631_N are connected to each other in parallel. Furthermore, the coil structure 630 may include a shielding conductor 632 that shields a magnetic force, and a conductive plate 633 that concentrates and delivers the magnetic force. The conductive plate 633 may be disposed on a surface of each of the first variable magnetism member 351 and the second variable magnetism member 352, which faces the first magnet member 411. The shielding conductor 632 may be disposed on the remaining surfaces of each of the first variable magnetism member 351 and the second variable magnetism member 352. According to an embodiment, the coil structure 630 may include a core (not illustrated). For example, a separate core (not illustrated) may be included in interiors of the plurality of coils 631_1 to 631_N.

Figure 7:
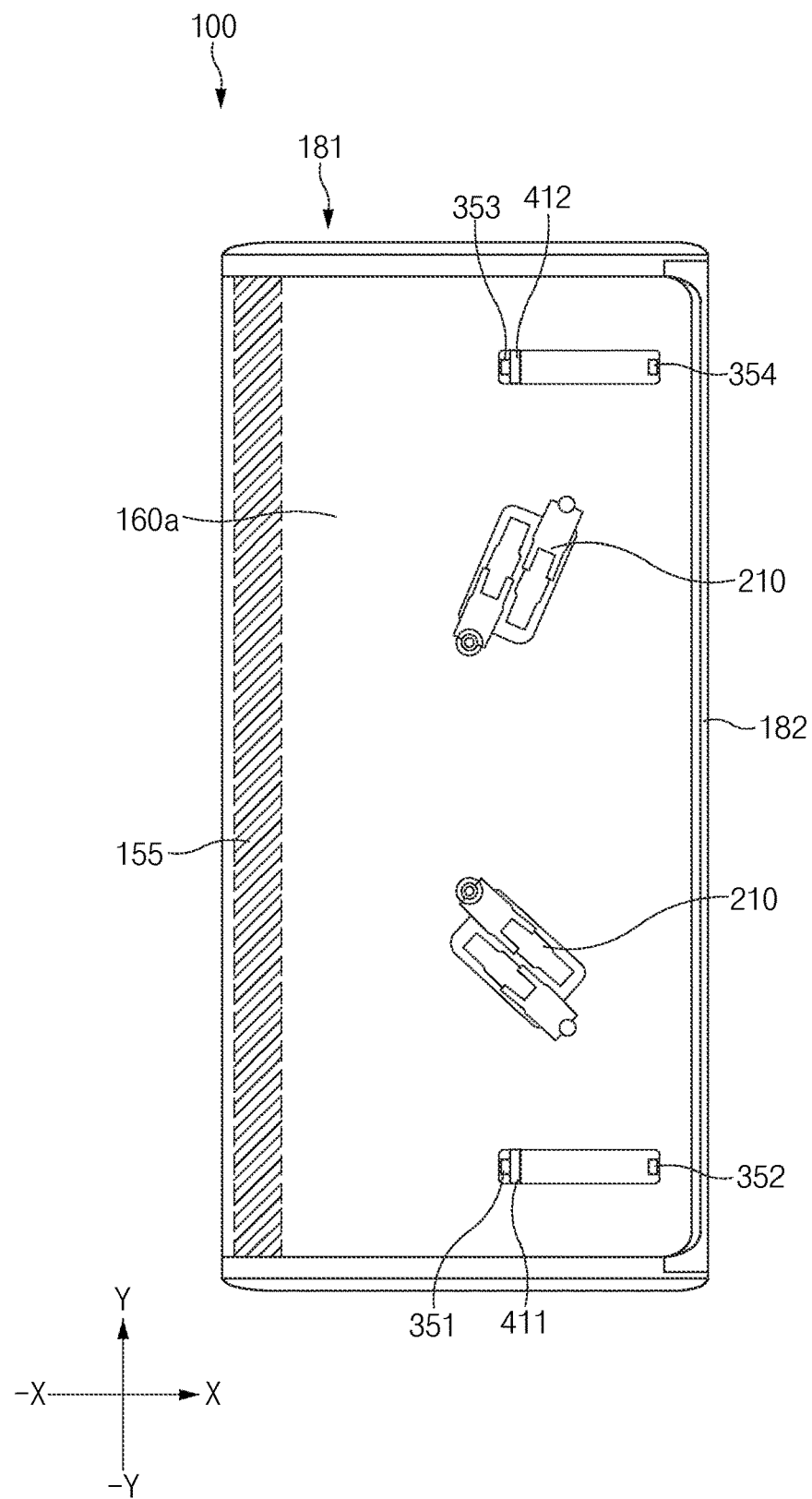
FIG. 7 is a view illustrating a locational relationship of an elastic module and a magnet member in the electronic device of FIG. 1, in the closed state according to an embodiment of the disclosure.

FIG. 7 is a view illustrating a locational relationship of an elastic module and a magnet member in an electronic device of FIG. 1, in a closed state according to an embodiment of the disclosure.

Figure 8:
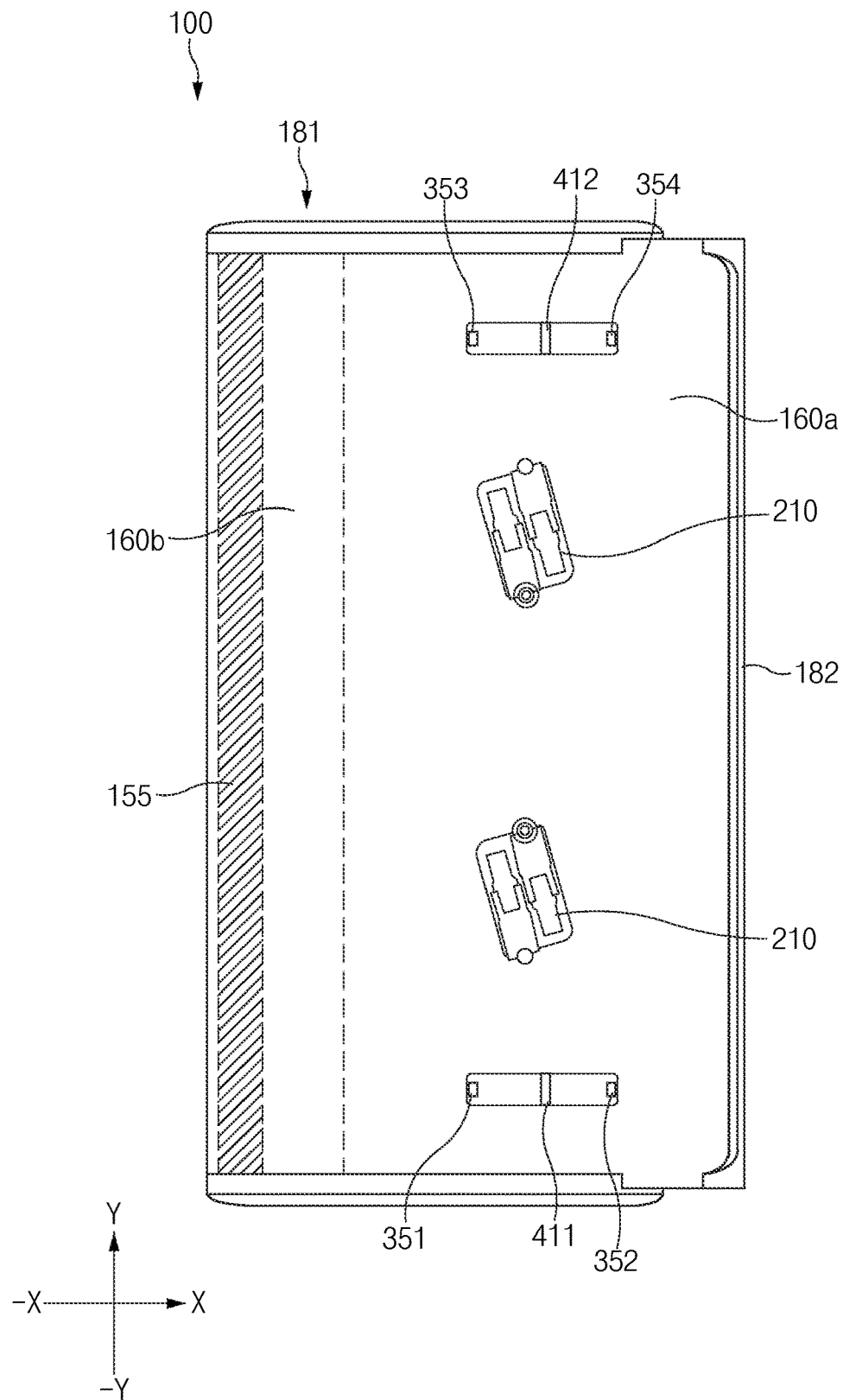
FIG. 8 is a view illustrating a locational relationship of an elastic module and a magnet member in the electronic device of FIG. 1, in an intermediate state according to an embodiment of the disclosure.

FIG. 8 is a view illustrating a locational relationship of an elastic module and a magnet member in an electronic device of FIG. 1, in an intermediate state according to an embodiment of the disclosure.

Figure 9:
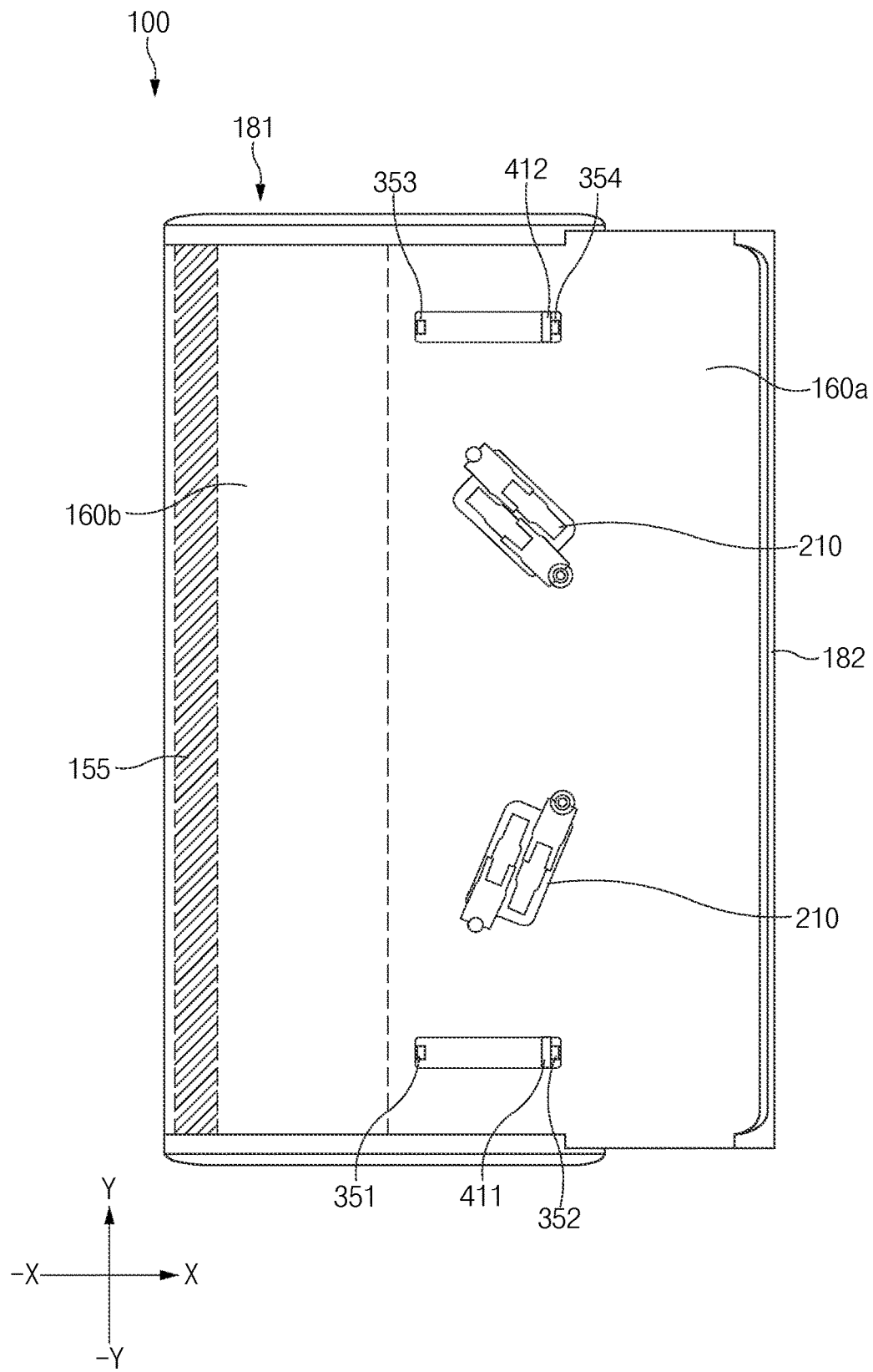
FIG. 9 is a view illustrating a locational relationship of an elastic module and a magnet member in the electronic device of FIG. 1, in an opened state according to an embodiment of the disclosure.

FIG. 9 is a view illustrating a locational relationship of an elastic module and a magnet member in an electronic device of FIG. 1, in an opened state according to an embodiment of the disclosure.

Figure 10:
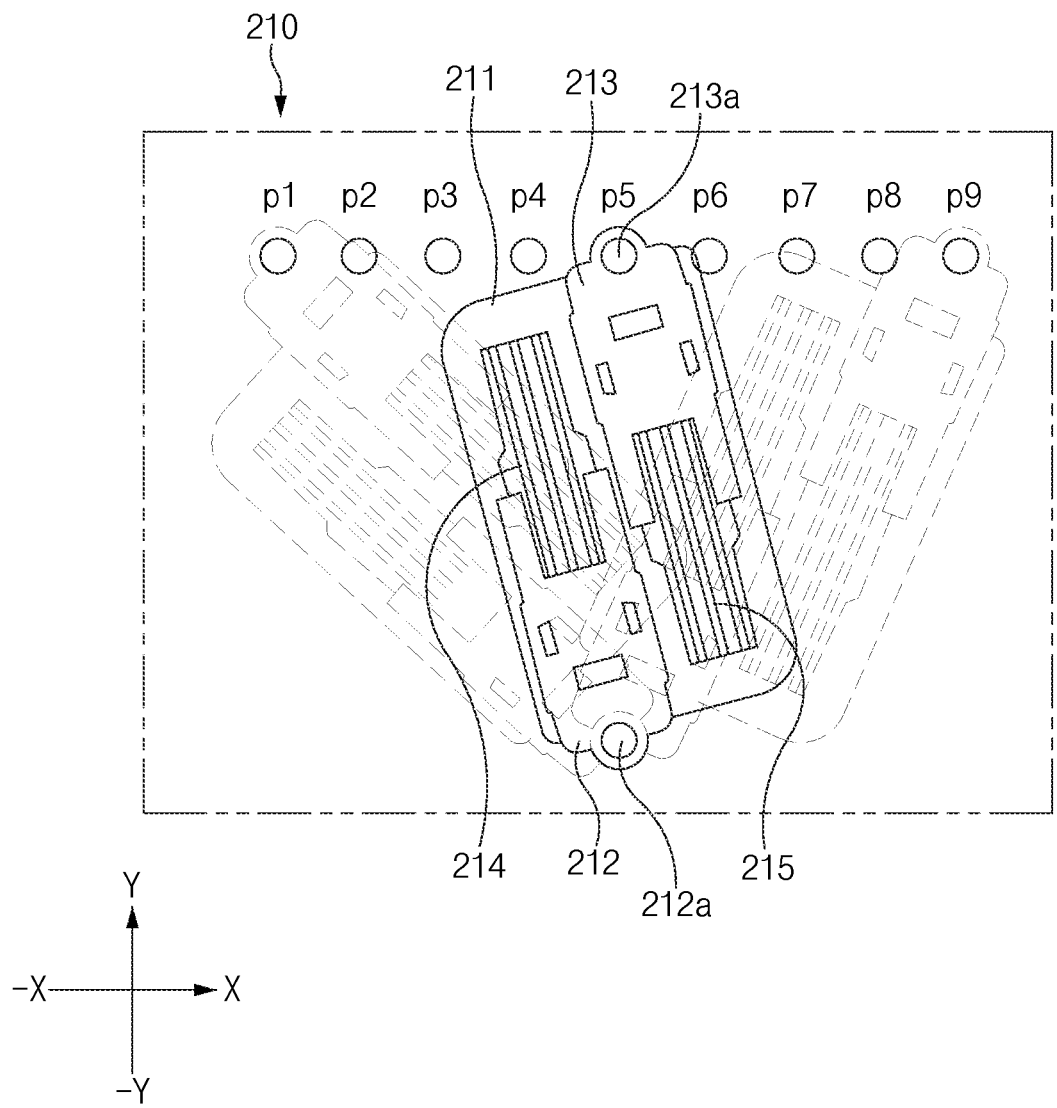
FIG. 10 is a view illustrating an operation of an elastic module according to an embodiment of the disclosure.

FIG. 10 is a view illustrating an operation of an elastic module according to an embodiment of the disclosure.

Referring to FIGS. 7 to 10, an electronic device 100 may include at least one elastic module 210, at least one magnet member (e.g., a first magnet member 411 and a second magnet member 412), and at least two variable magnetism members (e.g., a first variable magnetism member 351, a second variable magnetism member 352, a third variable magnetism member 353, and a fourth variable magnetism member 354). The second housing 182 may be slid in the first direction (e.g., the X axis direction) or the second direction (e.g., the −X axis direction).

According to an embodiment, the elastic module 210 may be disposed between the second housing 182 and the support structure 150 of FIG. 2. The elastic module 210 may change a direction of the elastic force based on the sliding operation of the second housing 182. For example, in a state from the closed state (e.g., the first state) to the intermediate state (e.g., the second state), the elastic module 210 may apply an elastic force in the second direction (e.g., the −X axis direction). In a state from the intermediate state (e.g., the second state) to the opened state (e.g., the third state), the elastic module 210 may apply an elastic force in the first direction (e.g., the X axis direction). For example, referring to FIG. 10, the elastic module 210 may include a first body 211, a second body 212, a third body 213, a first elastic body 214, and a second elastic body 215. The first elastic body 214 may connected between a portion of the first body 211 and the second body 212. The second elastic body 215 may connected between another portion of the first body 211 and the third body 213.

According to an embodiment, a first point 212a of rotation of the second body 212 may be connected to the support structure 150. A second point 213a of rotation of the third body 213 may be connected to the second housing 182. In a state, in which the first point 212a of rotation is stopped, the second point 213a of rotation may be moved between point p1 and point p9 according to the sliding operation of the second housing 182. At a point from point p1 to point p4, the second point 213a of rotation may be located in the second direction (e.g., the −X axis direction) of the first point 212a of rotation with respect to the Y axis such that the elastic force in the second direction (e.g., the −X axis direction) may be applied to the second housing 182. At point p5, the first point 212a of rotation and the second point 213a of rotation may be located on the straight line of the Y axis, and the elastic force applied to the second housing 182 may be balanced. At a point from point p6 to point p9, the second point 213a of rotation may be located in the first direction (e.g., the X axis direction) of the first point 212a of rotation with respect to the Y axis such that the elastic force in the first direction (e.g., the X axis direction) may be applied to the second housing 182.

According to an embodiment, when the second point 213a of rotation is located point p1, the first magnet member 411 (or the second magnet member 412) may be disposed adjacent (or close) to the first variable magnetism member 351 (or the third variable magnetism member 353). When the second point 213a of rotation is located at point p5, the first magnet member 411 (or the second magnet member 412) may be disposed at an intermediate point of the first variable magnetism member 351 (or the third variable magnetism member 353) and the second variable magnetism member 352 (or the fourth variable magnetism member 354). According to an embodiment, when the second point 213a of rotation is located point p9, the first magnet member 411 (or the second magnet member 412) may be disposed adjacent (or close) to the second variable magnetism member 352 (or the fourth variable magnetism member 354).

According to another embodiment, the elastic module 210 includes two bodies (e.g., the second body 212 and the third body 213) and one elastic body (e.g., the first elastic body 214). One elastic body (e.g., the first elastic body 214) may be connected between a portion of one body (e.g., the second body 212) and another body (e.g., the third body 213). For example, the elastic module 210 may change a direction of the elastic force based on the sliding operation of the second housing 182 by using one or a plurality of elastic bodies.

Figure 11:
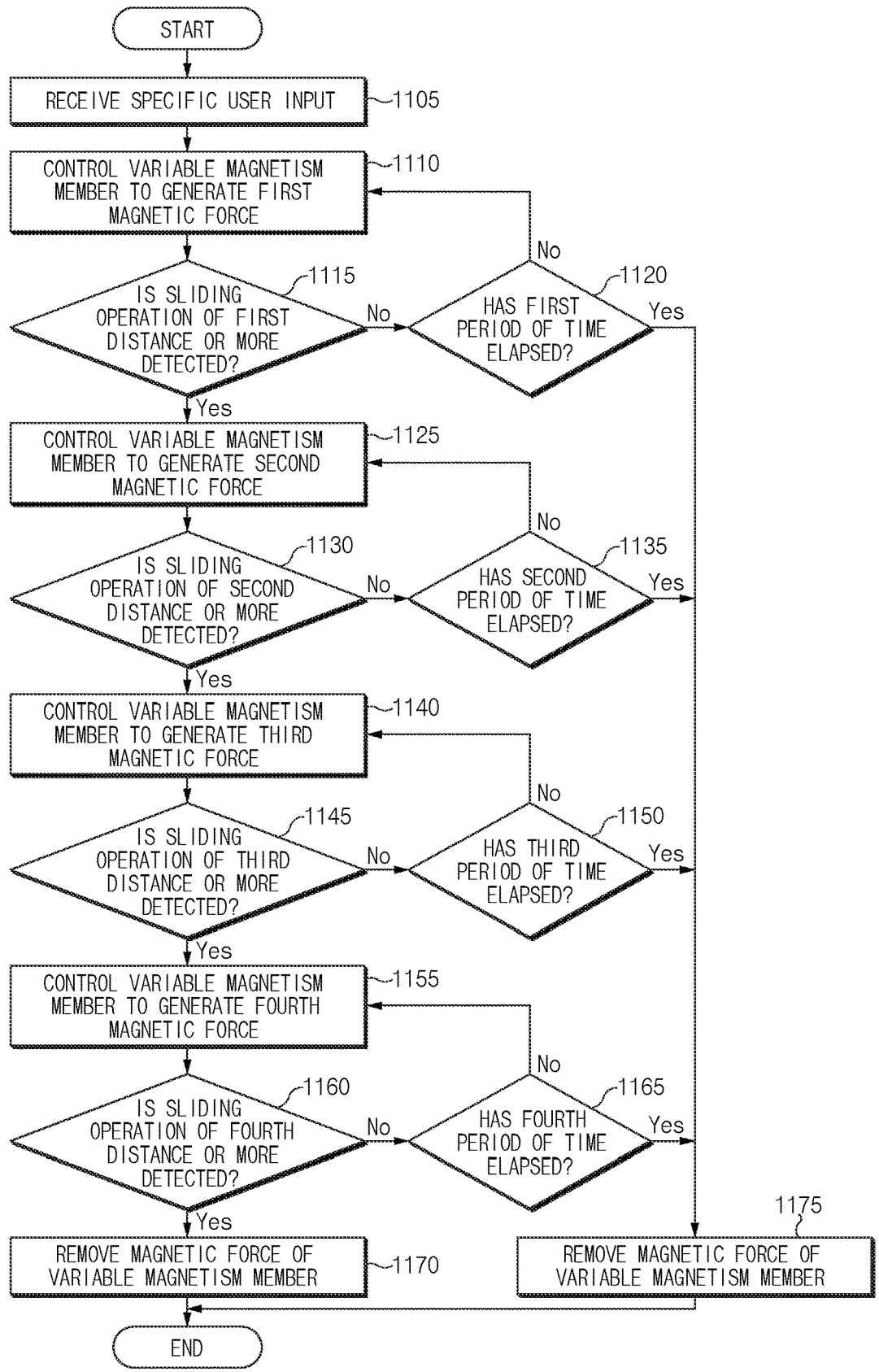
FIG. 11 is a flowchart illustrating a sliding operation of an electronic device according to an embodiment of the disclosure.

FIG. 11 is a flowchart illustrating a sliding operation of an electronic device according to an embodiment of the disclosure.

Figure 12:
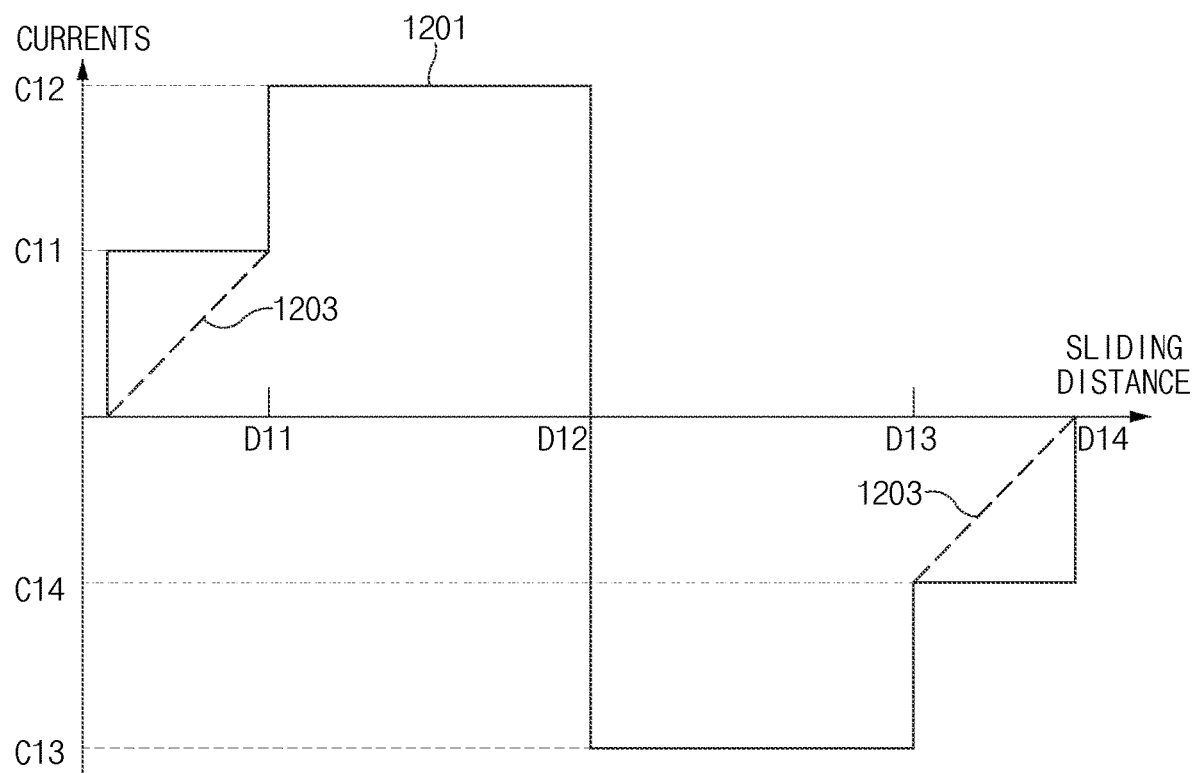
FIG. 12 is a timing diagram illustrating an example of a change in a current supplied to a variable magnetism member when a closed state is changed to an opened state according to an embodiment of the disclosure.

FIG. 12 is a timing diagram illustrating an example of a change in a current supplied to a variable magnetism member when a closed state is changed to an opened state according to an embodiment of the disclosure.

Figure 13:
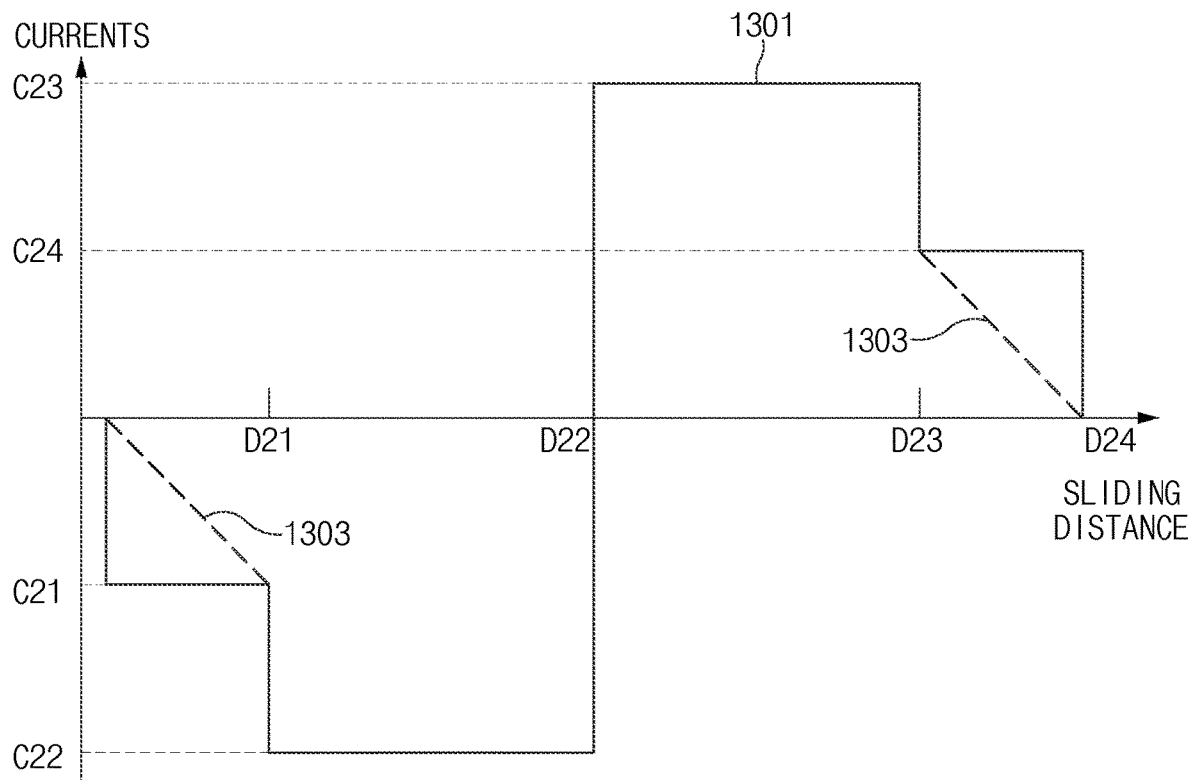
FIG. 13 is a timing diagram illustrating an example of a change in a current supplied to a variable magnetism member when an opened state is changed to a closed state according to an embodiment of the disclosure.

FIG. 13 is a timing diagram illustrating an example of a change in a current supplied to a variable magnetism member when an opened state is changed to a closed state according to an embodiment of the disclosure.

Referring to FIGS. 3 to 11, an electronic device 100 may include a second housing 182 that is slid in the first direction (e.g., the X axis direction) or the second direction (e.g., the −X axis direction). According to the sliding operation of the second housing 182, the display area of the display 160 may be expanded or contracted. The electronic device 100 may include the elastic module 210, and the second housing 182 may receive an elastic force in the second direction (e.g., the −X axis direction) in a first section, and may receive an elastic force in the first direction (e.g., the X axis direction) in a second section. Furthermore, the electronic device 100 may include the magnet members (e.g., the first magnet member 411 or the second magnet member 412) disposed on an inner surface (e.g., a surface that faces the −Y axis direction) of the second housing 182, and the variable magnetism members 350 (e.g., the first variable magnetism member 351, the second variable magnetism member 352, the third variable magnetism member 353, or the fourth variable magnetism member 354) disposed on one surface (e.g., a surface that faces the Y axis direction) of the printed circuit board 190. The magnet members may be disposed between the variable magnetism members 350.

According to an embodiment, the second housing 182 may perform a sliding operation (a first case) from the closed state (e.g., state 101 of FIG. 1) to the opened state (e.g., state 103 of FIG. 1) or a sliding operation (a second case) from the opened state to the closed state. The flowchart of FIG. 11 may be applied to both the two cases, and the respective cases will be described separately below. In the closed state, the magnet member may be disposed to adjacent (or close) to the variable magnetism member (e.g., the first variable magnetism member 351 or the third variable magnetism member 353) disposed in the second direction (e.g., the −X axis direction) with respect to the magnet member. In the opened state, the magnet member may be disposed to adjacent (or close) to the variable magnetism member (e.g., the second variable magnetism member 352 or the fourth variable magnetism member 354) disposed in the first direction (e.g., the X axis direction) with respect to the magnet member.

In regard to the first case, referring to FIG. 12, the second housing 182 may perform a sliding operation from a location corresponding to the closed state to a location corresponding to a fourth distance D14 via locations corresponding to a first distance D11, a second distance D12, and a third distance D13. For example, the location corresponding to the fourth distance D14 may mean the opened state. Furthermore, the second housing 182 may be further moved by a specific distance that is farther than the fourth distance D14 and may reach the location corresponding to the opened state.

According to an embodiment, in operation 1105, the processor 310 may receive a user input as a preliminary operation for the sliding operation. For example, the user input may include a touch input of a specific pattern (e.g., simultaneous touch of thumbs of both hands), a sliding movement of the second housing 182 by a specific distance (e.g., a distance that is shorter than the first distance D11), or a click of a specific physical button. The processor 310 may detect a touch input of a specific pattern through the touch module 320. The processor 310 may detect a sliding movement of the second housing 182 through the sensor module 330.

According to an embodiment, in operation 1110, the processor 310 may control variable magnetism members 350 to generate a first magnetic force (e.g., that has a first magnitude and causes a repulsive force between the first magnet member 411 and the first variable magnetism member 351 or between the second magnet member 412 and the third variable magnetism member 353) (to have the first magnetic force) when detecting the user input. For example, the processor 310 may supply a first current C11 that generates the first magnetic force to the variable magnetism members 350 through the current control circuit 340. Accordingly, in an initial operation of siding the second housing 182 in the first direction (e.g., the X axis direction), a force that is necessary for moving the second housing 182 may be reduced. Furthermore, the electronic device 100 may reduce power consumption when an intention of the user is not a sliding operation of the second housing 182 or is to stop a sliding operation during the sliding operation, by supplying a current (e.g., the first current C11) that is smaller than a maximum current (e.g., the second current C12) until a location corresponding to a specific distance (e.g., the first distance D11).

According to an embodiment, setting a polarity direction of the first magnetic force to be opposite to a polarity direction of the first magnet member 411 or the second magnet member 412 may include generating a repulsive force between the first magnet member 411 and the first variable magnetism member 351 or between the second magnet member 412 and the third variable magnetism member 353.

According to an embodiment, in operation 1115, the processor 310 may determine whether there is a sliding operation of the second housing 182 of the first distance D11 or more through the sensor module 330.

When there is no sliding operation of the second housing 182 of the first distance D11 or more, in operation 1115, the processor 310 may determine whether a first period of time elapses in the state of operation 1120. When the first period of time does not elapse (or until the first period of time elapses), the processor 310 may supply the first current C11 to the variable magnetism members 350 (operation 1110). When the first period of time elapses, the processor 310 may remove (interrupt supply of currents to the variable magnetism members 350) the magnetic forces of the variable magnetism members 350 (operation 1175). Alternatively, as another example, regardless of the lapse time, when detecting the sliding operation in the second direction (e.g., the −X axis direction), the processor 310 may remove (or interrupt supply of the currents to the variable magnetism members 350) the magnetic forces of the variable magnetism members 350. Accordingly, when there is no succeeding operation by the user for a specific period of time or a sliding operation of returning to the closed state is detected, the processor 310 may prevent power consumption.

When there is a sliding operation of the second housing 182 of the first distance D11 or more, in operation 1125, the processor 310 may control the variable magnetism members 350 to generate the second magnetic force (e.g., a magnetic force having a second magnitude (or a maximum magnitude) that is larger than the first magnitude and having the same direction as that of the first magnetic force) (or have the second magnetic force). For example, the processor 310 may supply a second current C12 that generates the second magnetic force to the variable magnetism members 350 through the current control circuit 340. Accordingly, when the second housing 182 is slid in the first direction (e.g., the X axis direction), a force (e.g., a pushing force of the user or a driving force of a motor) that is necessary for moving the second housing 182 may be reduced as compared with the initial operation.

According to an embodiment, in operation 1130, the processor 310 may determine whether there is a sliding operation of the second housing 182 of the second distance D12 (e.g., a location, at which a direction of the elastic force of the elastic module 210 is converted) or more through the sensor module 330.

When there is no sliding operation of the second housing 182 of the second distance D12 or more, in operation 1130, the processor 310 may determine whether a second period of time elapses in the state of operation 1135. The second period of time may be set to be the same as or different from the first period of time. When the second period of time does not elapse (or until the second period of time elapses), the processor 310 may supply the second current C12 to the variable magnetism members 350 (operation 1125). When the second period of time elapses, the processor 310 may remove (interrupt supply of currents to the variable magnetism members 350) the magnetic forces of the variable magnetism members 350 (operation 1175). Alternatively, as another example, regardless of the lapse time, when detecting the sliding operation in the second direction (e.g., the –X axis direction), the processor 310 may remove (or interrupt supply of the currents to the variable magnetism members 350) the magnetic forces of the variable magnetism members 350. Accordingly, when there is no succeeding operation by the user for a specific period of time or a sliding operation of returning to the closed state is detected, the processor 310 may prevent power consumption. Then, when another external forcer is not applied, the second housing 182 may return to the closed state by the elastic module 210.

When there is a sliding operation of the second housing 182 of the second distance D12 or more, in operation 1140, the processor 310 may control the variable magnetism members 350 to generate a third magnetic force (e.g., a magnetic force having a third magnitude (or the same magnitude as the second magnitude or a maximum magnitude) and having a direction that is opposite to that of the second magnetic force) (or have the third magnetic force). For example, the processor 310 may supply a third current C13 that generates the third magnetic force to the variable magnetism members 350 through the current control circuit 340. For example, the third current C13 may be a current, of which a flow is opposite to that of the second current C12. The third current C13 may be supplied by applying a voltage that is opposite to the voltage for supplying the second current C12 to the variable magnetism members 350 through the current control circuit 340. As an example, when the winding directions of the first variable magnetism member 351 and the second variable magnetism member 352 are the same, an attractive force may be applied between the first magnet member 411 and the second variable magnetism member 352 and the second housing 182 may be slid by a force that is reduced as compared with the initial operation. As another example, when the winding directions of the first variable magnetism member 351 and the second variable magnetism member 352 are opposite to each other, a repulsive force may be applied between the first magnet member 411 and the second variable magnetism member 352 and the second variable magnetism member 352 may function as a damper.

According to an embodiment, in operation 1145, the processor 310 may determine whether there is a sliding operation of the second housing 182 of the third distance D13 or more through the sensor module 330.

When there is no sliding operation of the second housing 182 of the third distance D13 or more in operation 1145, the processor 310 may determine whether a third period of time elapses in the state of operation 1150. The third period of time may be set to be the same as or different from the first period of time. When the third period of time does not elapse (or until the third period of time elapses), the processor 310 may supply the third current C13 to the variable magnetism members 350 (operation 1140). When the third period of time elapses, the processor 310 may remove (interrupt supply of currents to the variable magnetism members 350) the magnetic forces of the variable magnetism members 350 (operation 1175). Alternatively, as another example, regardless of the lapse time, when detecting the sliding operation in the second direction (e.g., the –X axis direction), the processor 310 may remove (or interrupt supply of the currents to the variable magnetism members 350) the magnetic forces of the variable magnetism members 350. Accordingly, when there is no succeeding operation by the user for a specific period of time or a sliding operation of returning to the closed state is detected, the processor 310 may prevent power consumption. Then, when another external forcer is not applied, the second housing 182 may be slid to the location corresponding to the opened state by the elastic module 210.

When there is a sliding operation of the second housing 182 of the third distance D13 or more, in operation 1155, the processor 310 may control the variable magnetism members 350 to generate a fourth magnetic force (e.g., a magnetic force having a fourth magnitude (a magnitude that is smaller than the third magnitude or the same magnitude as the first magnitude) and having the same direction as that of the third magnetic force) (or have the fourth magnetic force). For example, the processor 310 may supply a fourth current C14 that generates the fourth magnetic force to the variable magnetism members 350 through the current control circuit 340.

According to an embodiment, in operation 1160, the processor 310 may determine whether there is a sliding operation of the second housing 182 of the fourth distance D14 or more through the sensor module 330.

When there is no sliding operation of the second housing 182 of the fourth distance D14 or more in operation 1155, the processor 310 may determine whether a fourth period of time elapses in the state of operation 1165. The fourth period of time may be set to be the same as or different from the first period of time. When the fourth period of time does not elapse (or until the fourth period of time elapses), the processor 310 may supply the fourth current C14 to the variable magnetism members 350 (operation 1155). When the fourth period of time elapses, the processor 310 may remove (interrupt supply of currents to the variable magnetism members 350) the magnetic forces of the variable magnetism members 350 (operation 1175). Alternatively, as another example, regardless of the lapse time, when detecting the sliding operation in the second direction (e.g., the –X axis direction), the processor 310 may remove (or interrupt supply of the currents to the variable magnetism members 350) the magnetic forces of the variable magnetism members 350. Accordingly, when there is no succeeding operation by the user for a specific period of time or a sliding operation of returning to the closed state is detected, the processor 310 may prevent power consumption. Then, when another external forcer is not applied, the second housing 182 may be slid to the location corresponding to the opened state by the elastic module 210.

When there is a sliding operation of the second housing 182 of the fourth distance D14 or more in operation 1160, the processor 310 may remove (interrupt supply of currents to the variable magnetism members 350) the magnetic forces of the variable magnetism members 350 (operation 1170). When there is a sliding operation of the second housing 182 of the fourth distance D14 or more, the second housing 182 may be moved to a location of the opened state through the elastic module 210, and the opened state may be maintained.

In regard to the second case, referring to FIG. 13, the second housing 182 may perform a sliding operation from a location corresponding to the opened state to the location corresponding to a fourth distance D24 via locations corresponding to the first distance D21, the second distance D22, and the third distance D23. As an example, the location corresponding to the fourth distance D24 may mean the closed state. Furthermore, the second housing 182 may be further moved by a specific distance that is farther than the fourth distance D24 and may reach the location corresponding to the closed state.

According to an embodiment, in operation 1105, the processor 310 may receive a user input as a preliminary operation for the sliding operation. For example, the user input may include a touch input of a specific pattern (e.g., a specific touch input in a state, in which the first housing 181 is gripped), a sliding movement of the second housing 182 by a specific distance (e.g., a distance that is shorter than the first distance D21), or a click of a specific physical button.

According to an embodiment, in operation 1110, the processor 310 may control variable magnetism members to generate a first magnetic force (e.g., that has a first magnitude and causes a repulsive force between the first magnet member 411 and the second variable magnetism member 352 or between the second magnet member 412 and the fourth variable magnetism member 354) (to have the first magnetic force) when detecting the user input. For example, the processor 310 may supply a first current C21 that generates the first magnetic force to the variable magnetism members 350 through the current control circuit 340. Accordingly, in an initial operation of siding the second housing 182 in the second direction (e.g., the −X axis direction), a force (e.g., a pushing force of the user or a driving force of a motor) that is necessary for moving the second housing 182 may be reduced. Furthermore, the electronic device 100 may reduce power consumption when an intention of the user is not a sliding operation of the second housing 182 or is to stop a sliding operation during the sliding operation, by supplying a current (e.g., the first current C21) that is smaller than a maximum current (e.g., the second current C22) until a location corresponding to a specific distance (e.g., the first distance D21).

According to an embodiment, in operation 1115, the processor 310 may determine whether there is a sliding operation of the second housing 182 of the first distance D11 or more through the sensor module 330.

When there is no sliding operation of the second housing 182 of the first distance D21, in operation 1115, the processor 310 may determine whether a first period of time elapses in the state of operation 1120. When the first period of time does not elapses (or until the first period of time elapses), the processor 310 may supply the first current C21 to the variable magnetism members 350. When the first period of time elapses, the processor 310 may remove (interrupt supply of currents to the variable magnetism members 350) the magnetic forces of the variable magnetism members 350 (operation 1175). Alternatively, as another example, regardless of the lapse time, when detecting the sliding operation in the first direction (e.g., the X axis direction), the processor 310 may remove (or interrupt supply of the currents to the variable magnetism members 350) the magnetic forces of the variable magnetism members 350. Accordingly, when there is no succeeding operation by the user for a specific period of time or a sliding operation of returning to the opened state is detected, the processor 310 may prevent power consumption.

When there is a sliding operation of the second housing 182 of the first distance D21 or more, in operation 1125, the processor 310 may control the variable magnetism members 350 to generate the second magnetic force (e.g., a magnetic force having a second magnitude (or a maximum magnitude) that is larger than the first magnitude and having the same direction as that of the first magnetic force) (or have the second magnetic force). For example, the processor 310 may supply a second current C22 that generates the second magnetic force to the variable magnetism members 350 through the current control circuit 340. Accordingly, when the second housing 182 is slid in the second direction (e.g., the −X axis direction), a force (e.g., a pushing force of the user or a driving force of a motor) that is necessary for moving the second housing 182 may be reduced as compared with the initial operation.

According to an embodiment, in operation 1130, the processor 310 may determine whether there is a sliding operation of the second housing 182 of the second distance D22 (e.g., a location, at which a direction of the elastic force of the elastic module 210 is converted) or more through the sensor module 330.

When there is no sliding operation of the second housing 182 of the second distance D22 or more, in operation 1130, the processor 310 may determine whether a second period of time elapses in the state of operation 1135. The second period of time may be set to be the same as or different from the first period of time. When the second period of time does not elapse (or until the second period of time elapses), the processor 310 may supply the second current C22 to the variable magnetism members 350 (operation 1125). When the second period of time elapses, the processor 310 may remove (interrupt supply of currents to the variable magnetism members 350) the magnetic forces of the variable magnetism members 350 (operation 1175). Alternatively, as another example, regardless of the lapse time, when detecting the sliding operation in the first direction (e.g., the X axis direction), the processor 310 may remove (or interrupt supply of the currents to the variable magnetism members 350) the magnetic forces of the variable magnetism members 350. Accordingly, when there is no succeeding operation by the user for a specific period of time or a sliding operation of returning to the opened state is detected, the processor 310 may prevent power consumption. Then, when another external force is not applied, the second housing 182 may return to the opened state by the elastic module 210.

When there is a sliding operation of the second housing 182 of the second distance D22 or more, in operation 1140, the processor 310 may control the variable magnetism members 350 to generate a third magnetic force (e.g., a magnetic force having a third magnitude (or the same magnitude as the second magnitude or a maximum magnitude) and having a direction that is opposite to that of the second magnetic force) (or have the third magnetic force). For example, the processor 310 may supply a third current C23 that generates the third magnetic force to the variable magnetism members 350 through the current control circuit 340. As an example, when the winding directions of the first variable magnetism member 351 and the second variable magnetism member 352 are the same, an attractive force may be applied between the first magnet member 411 and the first variable magnetism member 351 and the second housing 182 may be slid by a force that is reduced as compared with the initial operation. As another example, when the winding directions of the first variable magnetism member 351 and the second variable magnetism member 352 are opposite to each other, a repulsive force may be applied between the first magnet member 411 and the first variable magnetism member 351 and the first variable magnetism member 351 may function as a damper.

According to an embodiment, in operation 1145, the processor 310 may determine whether there is a sliding operation of the second housing 182 of the third distance D23 or more through the sensor module 330.

When there is no sliding operation of the second housing 182 of the third distance D23 or more in operation 1145, the processor 310 may determine whether a third period of time elapses in the state of operation 1150. The third period of time may be set to be the same as or different from the first period of time. When the third period of time does not elapse (or until the third period of time elapses), the processor 310 may supply the third current C23 to the variable magnetism members 350 (operation 1140). When the third period of time elapses, the processor 310 may remove (interrupt supply of currents to the variable magnetism members 350) the magnetic forces of the variable magnetism members 350 (operation 1175). Alternatively, as another example, regardless of the lapse time, when detecting the sliding operation in the first direction (e.g., the X axis direction), the processor 310 may remove (or interrupt supply of the currents to the variable magnetism members 350) the magnetic forces of the variable magnetism members 350. Accordingly, when there is no succeeding operation by the user for a specific period of time or a sliding operation of returning to the opened state is detected, the processor 310 may prevent power consumption. Then, when another external forcer is not applied, the second housing 182 may be slid to the location corresponding to the closed state by the elastic module 210.

When there is a sliding operation of the second housing 182 of the third distance D23 or more, in operation 1155, the processor 310 may control the variable magnetism members 350 to generate a fourth magnetic force (e.g., a magnetic force having a fourth magnitude (a magnitude that is smaller than the third magnitude or the same magnitude as the first magnitude) and having the same direction as that of the third magnetic force) (or have the third magnetic force). For example, the processor 310 may supply a fourth current C24 that generates the fourth magnetic force to the variable magnetism members 350 through the current control circuit 340.

According to an embodiment, in operation 1160, the processor 310 may determine whether there is a sliding operation of the second housing 182 of the fourth distance D24 or more through the sensor module 330.

When there is no sliding operation of the second housing 182 of the fourth distance D24 or more in operation 1155, the processor 310 may determine whether a fourth period of time elapses in the state of operation 1165. The fourth period of time may be set to be the same as or different from the first period of time. When the fourth period of time does not elapse (or until the fourth period of time elapses), the processor 310 may supply the fourth current C24 to the variable magnetism members 350 (operation 1155). When the fourth period of time elapses, the processor 310 may remove (interrupt supply of currents to the variable magnetism members 350) the magnetic forces of the variable magnetism members 350 (operation 1175). Alternatively, as another example, regardless of the lapse time, when detecting the sliding operation in the first direction (e.g., the X axis direction), the processor 310 may remove (or interrupt supply of the currents to the variable magnetism members 350) the magnetic forces of the variable magnetism members 350. Accordingly, when there is no succeeding operation by the user for a specific period of time or a sliding operation of returning to the opened state is detected, the processor 310 may prevent power consumption. Then, when another external forcer is not applied, the second housing 182 may be slid to the location corresponding to the closed state by the elastic module 210.

When there is a sliding operation of the second housing 182 of the fourth distance D24 or more in operation 1160, the processor 310 may remove (interrupt supply of currents to the variable magnetism members 350) the magnetic forces of the variable magnetism members 350 (operation 1170). When there is a sliding operation of the second housing 182 of the fourth distance D24 or more, the second housing 182 may be moved to a location of the closed state through the elastic module 210, and the closed state may be maintained.

Figure 14:
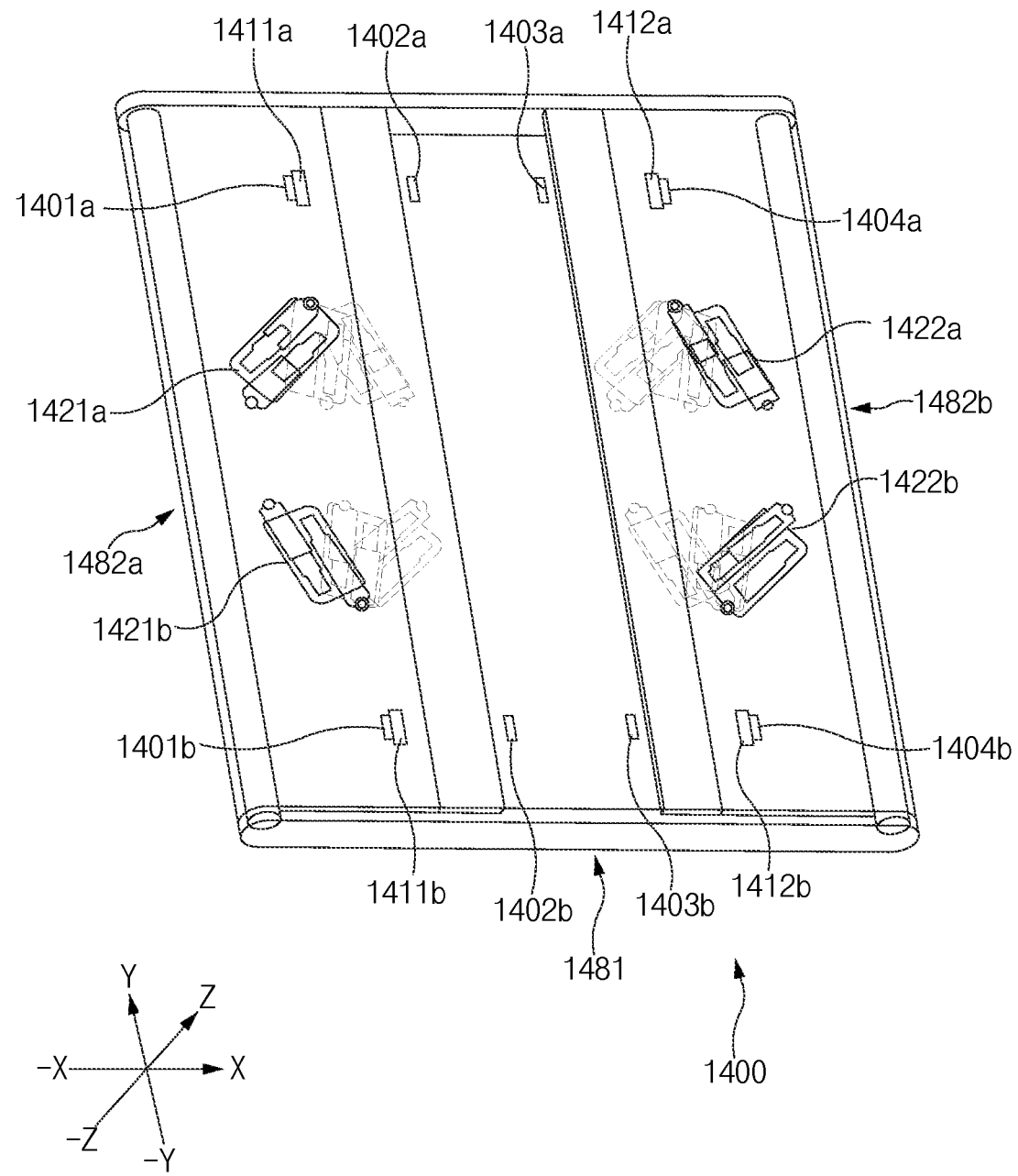
FIG. 14 illustrates an electronic device according to an embodiment of the disclosure.

As an embodiment, in FIG. 13 or FIG. 14, currents supplied to the variable magnetism members 350 may be increased or decreased in steps as in solid line graphs 1201 or 1301. As another embodiment, the currents supplied to the variable magnetism members 350 may be linearly increased or decreased as in dotted line graphs 1203 or 1303.

FIG. 14 illustrates an electronic device according to an embodiment of the disclosure.

Referring to FIG. 14, an electronic device 1400 may include a display that is expanded in opposite directions. For example, the electronic device 1400 may include a first housing 1481, a second housing 1482a, and a third housing 1482b. The second housing 1482a and the third housing 1482b may be slid in the first direction (e.g., the X axis direction) or the second direction (e.g., the −X axis direction) with respect to the first housing 1481. When the second housing 1482a is slid in the second direction (e.g., the −X axis direction), the display may be expanded. Alternatively, when the third housing 1482b is slid in the first direction (e.g., the X axis direction), the display may be expanded.

According to an embodiment, a first elastic module 1421a and a second elastic module 1421b may be connected between the second housing 1482a and the support structure fixed to the first housing 1481. A third elastic module 1422a and a fourth elastic module 1422b may be connected to the third housing 1482b and the support structure.

According to an embodiment, a first variable magnetism member 1401a, a second variable magnetism member 1402a, a third variable magnetism member 1401b, a fourth variable magnetism member 1402b, a fifth variable magnetism member 1403a, a sixth variable magnetism member 1404a, a seventh variable magnetism member 1403b, and a eighth variable magnetism member 1404b may be disposed in the printed circuit board fixed to the support structure. A first magnet member 1411a and a second magnet member 1411b may be disposed in the second housing 1482a. A third magnet member 1412a and a fourth magnet member 1412b may be disposed in the third housing 1482b. The first magnet member 1411a may be disposed between the first variable magnetism member 1401a and the second variable magnetism member 1402a. The second magnet member 1411b may be disposed between the third variable magnetism member 1401b and the fourth variable magnetism member 1402b. The third magnet member 1412a may be disposed between the fifth variable magnetism member 1403a and the sixth variable magnetism member 1404a. The fourth magnet member 1412b may be disposed between the seventh variable magnetism member 1403b and the eighth variable magnetism member 1404b.

According to an embodiment, during the sliding operation of the second housing 1482a, the processor (e.g., the processor 310) may control the first variable magnetism member 1401a, the second variable magnetism member 1402a, the third variable magnetism member 1401b, or the fourth variable magnetism member 1402b, based on the method of FIG. 11. During the sliding operation of the third housing 1482b, the processor (e.g., the processor 310) may control the fifth variable magnetism member 1403a, the sixth variable magnetism member 1404a, the seventh variable magnetism member 1403b, or the eighth variable magnetism member 1404b, based on the method of FIG. 11.

Figure 15:
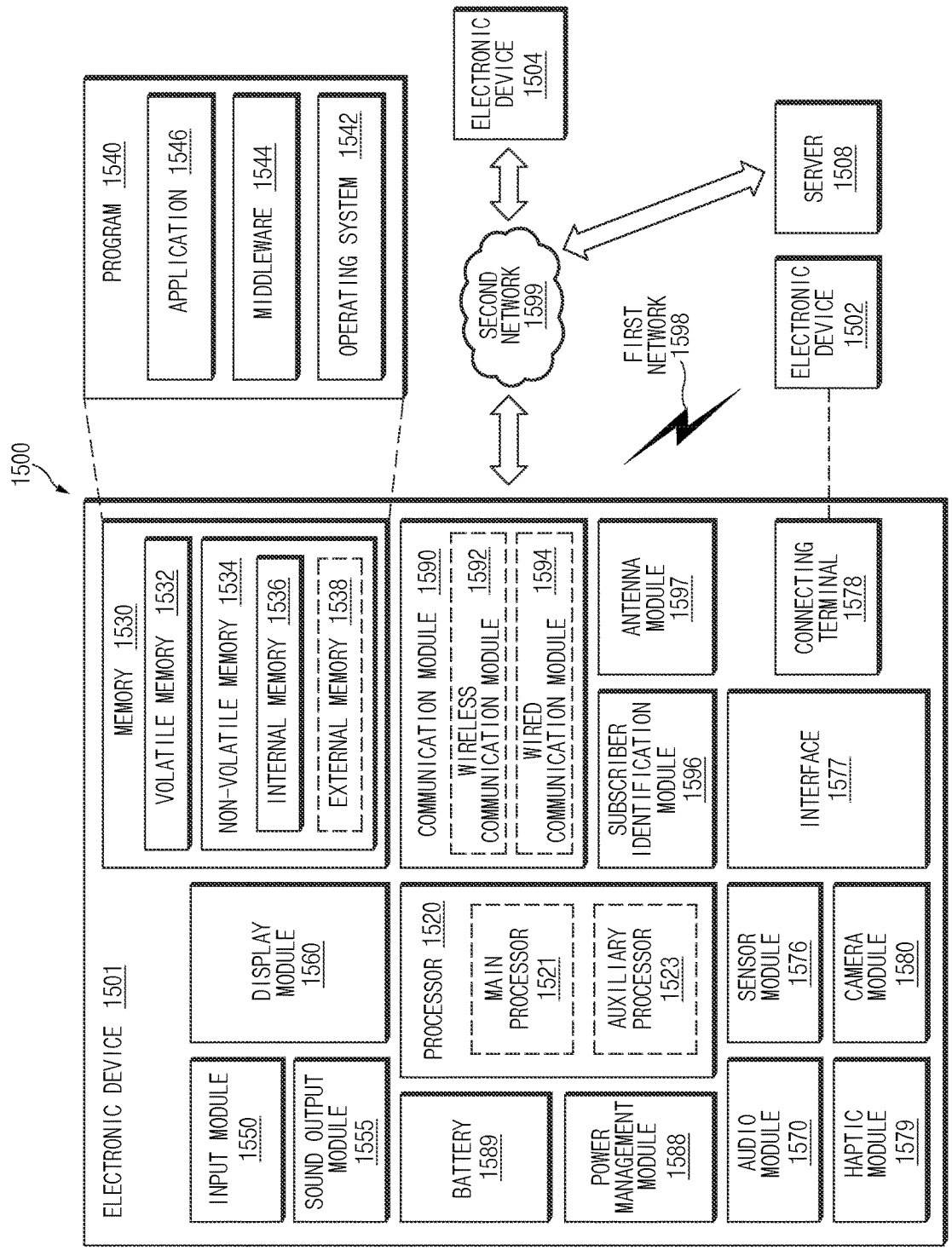
FIG. 15 is a block diagram illustrating an example electronic device in a network environment according to embodiment of the disclosure.

FIG. 15 is a block diagram illustrating an example electronic device in a network environment according to an embodiment of the disclosure.

Referring to FIG. 15, an electronic device 1501 in a network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 178, a haptic module 1579, a camera module 1580, a power management module 1588, a battery 1589, a communication module 1590, a subscriber identification module (SIM) 1596, or an antenna module 1597. In various embodiments, at least one (e.g., the connecting terminal 1578) of the components may be omitted from the electronic device 1501, or one or more other components may be added in the electronic device 1501. In various embodiments, some (e.g., the sensor module 1576, the camera module 1580, or the antenna module 1597) of the components may be integrated into one component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may store a command or data received from a different component (e.g., the sensor module 1576 or the communication module 1590) in a volatile memory 1532, process the command or the data stored in the volatile memory 1532, and store resulting data in a non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with the main processor 1521. For example, when the electronic device 1501 includes the main processor 1521 and the auxiliary processor 1523, the auxiliary processor 1523 may be configured to use less power than the main processor 1521 or to be specialized for a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application), for example. According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., a neural network processing device) may include a hardware structure specialized for processing an artificial intelligence model. The artificial intelligence model may be generated through machine learning. Such learning may be performed, for example, in the electronic device 1501 itself on which artificial intelligence is performed, or may be performed through a separate server (e.g., the server 1508). The learning algorithm may include, for example, supervised learning, unsupervised learning, semi-supervised learning, or reinforcement learning, but is not limited to the above-mentioned examples. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more of the above networks, but is not limited to the above examples. The artificial intelligence model may additionally or alternatively include a software structure, in addition to the hardware structure.

The memory 1530 may store various data to be used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by a component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501.

The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or may output the sound via the sound output module 1555 or an external electronic device (e.g., the electronic device 1502) (e.g., a speaker or a headphone) directly or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with an external electronic device (e.g., the electronic device 1502) directly or wirelessly. According to an embodiment, the interface 1577 may include, for example, a high definition multimedia interface (HDMI), a universal serial bus (USB) interface, a secure digital (SD) card interface, or an audio interface.

The connecting terminal 1578 may include a connector via which the electronic device 1501 may be physically connected with the external electronic device (e.g., the electronic device 1502). According to an embodiment, the connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to an embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell that is not rechargeable, a secondary cell that is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device 1504 via the first network 1598 (e.g., a short-range communication network, such as Bluetooth™ wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be integrated into a single component (e.g., a single chip), or may be implemented as multi-components (e.g., multi chips) separate from each other. The wireless communication module 1592 may identify or authenticate the electronic device 1501 in a communication network, such as the first network 1598 or the second network 1599, using subscriber information (e.g., international mobile subscriber identity (IMSI)) stored in the subscriber identification module 196.

The wireless communication module 1592 may support a 5G network after a 4G network and a next-generation communication technology, for example, a new radio access technology (NR). NR access technology may support a high-speed transmission of high-capacity data (enhanced mobile broadband (eMBB)), minimization of terminal power and access to multiple terminals (massive machine type communications (mMTC)), or high reliability and low latency (ultra-reliable and low-latency communications (URLLC)). The wireless communication module 1592 may support a high frequency band (e.g., mmWave band) to achieve a high data rate, for example. The wireless communication module 1592 may support various techniques for securing performance in a high frequency band, for example, beamforming, massive multiple-input and multiple-output (MIMO), full dimensional MIMO (FD-MIMO), array antenna, analog beamforming, or large scale antenna. The wireless communication module 1592 may support various requirements defined in the electronic device 1501, an external electronic device (e.g., the electronic device 1504), or a network system (e.g., the second network 1599). According to an embodiment, the wireless communication module 1592 may support a peak data rate (e.g., 20 Gbps or more) for achieving the eMBB, loss coverage (e.g., 164 dB or less) for achieving the mMTC, or U-plane latency (e.g., 0.5 ms or less each for downlink (DL) and uplink (UL), or 1 ms or less for the round trip) for achieving the URLLC.

The antenna module 1597 may transmit or receive a signal or power to or from the outside (e.g., an external electronic device) of the electronic device 1501. According to an embodiment, the antenna module 1597 may include an antenna including a radiating element including a conductive material or a conductive pattern formed in or on a substrate (e.g., PCB). According to an embodiment, the antenna module 1597 may include a plurality of antennas (e.g., an antenna array). In such a case, at least one antenna appropriate for a communication scheme used in the communication network, such as the first network 1598 or the second network 1599, may be selected from among the plurality of antennas, for example, by the communication module 1590. The signal or the power may then be transmitted or received between the communication module 1590 and the external electronic device via the selected at least one antenna. According to various embodiments, another component (e.g., a radio frequency integrated circuit (RFIC)) other than the radiating element may be additionally formed as a part of the antenna module 1597.

According to various embodiments, the antenna module 1597 may form an mmWave antenna module. According to an embodiment, the mmWave antenna module may include a printed circuit board, an RFIC disposed on or adjacent to a first surface (e.g., bottom surface) of the printed circuit board and capable of supporting a specified high frequency band (e.g., mmWave band), and a plurality of antennas (e.g., an array antenna) disposed on or adjacent to a second surface (e.g., top or side surface) of the printed circuit board and capable of transmitting or receiving signals of the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the external electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To this end, a cloud computing, distributed computing, mobile edge computing (MEC), or client-server computing technology may be used, for example. The electronic device 1501 may provide an ultra-low latency service using, for example, distributed computing or mobile edge computing. In an embodiment, the external electronic device 1504 may include an Internet of things (IoT) device. The server 1508 may be an intelligent server using machine learning and/or neural networks. According to an embodiment, the external electronic device 1504 or the server 1508 may be included in the second network 1599. The electronic device 1501 may be applied to an intelligent service (e.g., smart home, smart city, smart car, or health care) based on 5G communication technology and IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

As used in various embodiments of the disclosure, the term "module" may include a unit implemented in hardware, software, or firmware, or any combination thereof, and may interchangeably be used with other terms, for example, "logic," "logic block," "part," "circuitry," or the like. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 100). For example, a processor (e.g., the processor 1520) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the plurality of entities may be disposed separately from other components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first housing;
a second housing coupled to the first housing and configured to perform a sliding operation;
a display, of which a size of a visual exposure area is changed in correspondence to the sliding operation of the second housing;
a first variable magnetism member disposed at a first location of the first housing, and of which a magnetic force varies depending on a current or a voltage that is supplied thereto;
a second variable magnetism member disposed at a second location of the first housing, and of which a magnetic force varies depending on a current or a voltage that is supplied thereto;
a magnet member fixed to an inner surface of the second housing, and configured to move between the first variable magnetism member and the second variable magnetism member during the sliding operation; and
a processor operatively connected to the first variable magnetism member and the second variable magnetism member,
wherein the magnet member is disposed adjacent to the first variable magnetism member in a closed state, in which the first housing and the second housing overlap each other by a first extent, and
wherein the processor is configured to:
in response to receiving a user input, control the first variable magnetism member such that the first variable magnetism member has a first magnetic force of a first magnitude,
control the first variable magnetism member such that the first variable magnetism member has a second magnetic force of a second magnitude that is larger than the first magnitude in response to the second housing being moved from a location corresponding to the closed state by a first distance or more such that an overlapping area of the first housing and the second housing becomes smaller, and
set polarity directions of the first magnetic force and the second magnetic force to be opposite to a polarity direction of the magnet member.

2. The electronic device of claim 1, wherein the processor is further configured to:
control the second variable magnetism member such that the second variable magnetism member has a third magnetic force of a third magnitude in response to the second housing being moved from the location corresponding to the closed state by not less than a second distance that is larger than the first distance.

3. The electronic device of claim 2, wherein the processor is further configured to:
designate the third magnitude to a same magnitude as the second magnitude or a maximum magnetic force magnitude of the second variable magnetism member, and
designate a polarity direction of the third magnetic force to be the same as the polarity direction of the second magnetic force.

4. The electronic device of claim 2, wherein the processor is further configured to:
designate the third magnitude to the same magnitude as the second magnitude or a maximum magnetic force magnitude of the second variable magnetism member, and
designate a polarity direction of the third magnetic force to be opposite to the polarity direction of the second magnetic force.

5. The electronic device of claim 2, wherein the processor is further configured to:
control the second variable magnetism member such that the second variable magnetism member has a fourth magnetic force of a fourth magnitude in response to the second housing being moved from the location corresponding to the closed state by not less than a third distance that is larger than the second distance.

6. The electronic device of claim 5, wherein the processor is further configured to:
designate the fourth magnitude to be larger than or the same as the first magnitude and be smaller than the third magnitude, and
designate a polarity direction of the fourth magnetic force to be the same as the polarity direction of the first magnetic force.

7. The electronic device of claim 5, wherein the processor is further configured to:
designate the fourth magnitude to be larger than or the same as the first magnitude and be smaller than the third magnitude, and
designate a polarity direction of the fourth magnetic force to be opposite to the polarity direction of the first magnetic force.

8. The electronic device of claim 5, wherein the processor is further configured to:

remove the magnetic forces of the first variable magnetism member and the second variable magnetism member in response to the second housing being moved from the location corresponding to the closed state by not less than a fourth distance that is larger than the third distance.

9. The electronic device of claim 8, wherein the second housing reaches to a location corresponding to an opened state, in which the first housing and the second housing overlap each other by a second extent that is smaller than the first extent, from a location corresponding to the fourth distance.

10. The electronic device of claim 2, further comprising:
an elastic module,
wherein the elastic module is configured to:
apply an elastic force to the second housing such that the overlapping area of the first housing and the second housing becomes larger, at a location from the location corresponding to the closed state to the location corresponding to the second distance, and
apply an elastic force to the second housing such that the overlapping area of the first housing and the second housing becomes smaller, at a location corresponding to the second distance or more.

11. The electronic device of claim 1, further comprising:
a touch sensor configured to detect a touch to the display; and
a sensor configured to detect a movement of the second housing,
wherein the user input comprises:
a specific touch pattern for the display,
a movement in a direction of the sliding operation of the second housing, or
a click of a specific physical button.

12. The electronic device of claim 1, further comprising:
a current control circuit configured to supply a current to the first variable magnetism member or the second variable magnetism member,
wherein the processor is further configured to:
in response to receiving the user input, supply a first current to the first variable magnetism member through the current control circuit,
supply a second current that is larger than the first current to the first variable magnetism member in response to the second housing being moved from the location corresponding to the closed state by the first distance or more such that the overlapping area of the first housing and the second housing becomes larger,
cause the first variable magnetism member to generate the first magnetic force having the polarity direction that is opposite to the polarity direction of the magnet member by using the first current, and
cause the first variable magnetism member to generate the second magnetic force having the polarity direction that is opposite to the polarity direction of the magnet member by using the second current.

13. The electronic device of claim 12, wherein the processor is further configured to:
linearly increase the first current while the second housing is slid to a location corresponding to the first distance.

14. The electronic device of claim 1, wherein the processor is further configured to:
remove the magnetic forces of the first variable magnetism member and the second variable magnetism member in response to the second housing not being slid to a location corresponding to the first distance for a first period of time.

15. An electronic device comprising:
a first housing;
a second housing coupled to the first housing and configured to perform a sliding operation;
a display, of which a size of a visual exposure area is changed in correspondence to the sliding operation of the second housing;
a first variable magnetism member disposed at a first location of the first housing, and of which a magnetic force varies depending on a current or a voltage that is supplied thereto;
a second variable magnetism member disposed at a second location of the first housing, and of which a magnetic force varies depending on a current or a voltage that is supplied thereto;
a magnet member fixed to an inner surface of the second housing, and configured to move between the first variable magnetism member and the second variable magnetism member during the sliding operation; and
a processor operatively connected to the first variable magnetism member and the second variable magnetism member,
wherein the magnet member is disposed adjacent to the second variable magnetism member in an opened state, in which the first housing and the second housing overlap each other by a first extent, and
wherein the processor is configured to:
control the second variable magnetism member such that the second variable magnetism member has a first magnetic force of a first magnitude, in response to receiving a specific user input,
control the second variable magnetism member such that the second variable magnetism member has a second magnetic force of a second magnitude that is larger than the first magnitude in response to the second housing being moved from a location corresponding to the opened state by a first distance or more such that an overlapping area of the first housing and the second housing becomes larger, and
set polarity directions of the first magnetic force and the second magnetic force to be opposite to a polarity direction of the magnet member.

16. The electronic device of claim 15, wherein the processor is further configured to:
control the second variable magnetism member such that the second variable magnetism member has a third magnetic force of a third magnitude in response to the second housing being moved from the location corresponding to the opened state by not less than a second distance that is larger than the first distance such that the overlapping area of the first housing and the second housing becomes larger,
designate the third magnitude to a same magnitude as the second magnitude or a maximum magnetic force magnitude of the second variable magnetism member, and
designate a polarity direction of the third magnetic force to be the same as or opposite to the polarity direction of the second magnetic force.

17. The electronic device of claim 16, wherein the processor is further configured to:
control the second variable magnetism member such that the second variable magnetism member has a fourth magnetic force of a fourth magnitude in response to the second housing being moved from the location corresponding to the opened state by not less than a third distance that is larger than the second distance, designate the fourth magnitude to be larger than or the same as the first magnitude and be smaller than the third magnitude, and designate a polarity direction of the fourth magnetic force to be the same as or opposite to the polarity direction of the first magnetic force.

18. The electronic device of claim 17, wherein the processor is further configured to:

remove the magnetic forces of the first variable magnetism member and the second variable magnetism member in response to the second housing being moved from the location corresponding to the opened state by not less than a fourth distance that is larger than the third distance.

19. The electronic device of claim 18, wherein the second housing reaches a location corresponding to a closed state, in which the first housing and the second housing overlap each other by a second extent that is larger than the first extent, from a location corresponding to the fourth distance.

20. The electronic device of claim 16, further comprising:

an elastic module, wherein the elastic module is configured to:

apply an elastic force to the second housing such that the overlapping area of the first housing and the second housing becomes smaller, at a location from the location corresponding to the opened state to the location corresponding to the second distance, and apply an elastic force to the second housing such that the overlapping area of the first housing and the second housing becomes larger, at a location corresponding to the second distance or more.

* * * * *